(12) United States Patent
Till

(10) Patent No.: US 9,108,803 B2
(45) Date of Patent: Aug. 18, 2015

(54) METHOD FOR HANDLING CONTAINERS AND CONTAINER HANDLING MACHINE

(75) Inventor: Volker Till, Hofheim am Taunus (DE)

(73) Assignee: KHS GmbH, Dortmund (DE)

( * ) Notice: Subject to any disclaimer, the term of this patent is extended or adjusted under 35 U.S.C. 154(b) by 521 days.

(21) Appl. No.: 12/340,594

(22) Filed: Dec. 19, 2008

(65) Prior Publication Data
US 2009/0159152 A1   Jun. 25, 2009

Related U.S. Application Data

(63) Continuation-in-part of application No. PCT/EP2007/005342, filed on Jun. 18, 2007.

(30) Foreign Application Priority Data

Jun. 20, 2006 (DE) .......................... 10 2006 028 266

(51) Int. Cl.
| | | |
|---|---|---|
| *B65B 43/42* | (2006.01) | |
| *B65G 29/00* | (2006.01) | |
| *B65B 43/60* | (2006.01) | |
| *B67C 3/24* | (2006.01) | |
| *B08B 9/32* | (2006.01) | |
| *B08B 9/42* | (2006.01) | |

(52) U.S. Cl.
CPC . *B65G 29/00* (2013.01); *B08B 9/32* (2013.01); *B08B 9/42* (2013.01); *B65B 43/60* (2013.01); *B67C 3/24* (2013.01)

(58) Field of Classification Search
CPC .......... B65G 29/00; B65B 43/60; B65B 1/30; B65B 3/26; B67C 3/22; B67C 3/24; B08B 9/32; B08B 9/42
USPC .......................... 141/144, 145, 165, 168, 171
See application file for complete search history.

(56) References Cited

U.S. PATENT DOCUMENTS

| 1,456,690 A | 5/1923 | Goldberger |
| 1,460,211 A * | 6/1923 | Nicholas et al. ............... 141/150 |
| 5,509,524 A | 4/1996 | Ohmori et al. |
| 6,772,806 B2 * | 8/2004 | De Villele ..................... 141/144 |

FOREIGN PATENT DOCUMENTS

| JP | 60-002487 A | 1/1985 |
| JP | 10-120089 A | 5/1998 |
| JP | 2000-211693 A | 8/2000 |
| JP | 2003-503179 A | 1/2003 |
| JP | 2003-532593 A | 11/2003 |

OTHER PUBLICATIONS

International Search Report PCT/EP2007/005342 and English translation thereof.
International Preliminary Report on Patentability PCT/EP2007/005342 and English translation thereof.

* cited by examiner

*Primary Examiner* — Christopher Kim
(74) *Attorney, Agent, or Firm* — Nils H. Ljungman & Associates

(57) ABSTRACT

A method for handling containers and container handling machine. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

6 Claims, 16 Drawing Sheets

METHOD FOR HANDLING CONTAINERS AND CONTAINER HANDLING MACHINE

CONTINUING APPLICATION DATA

This application is a Continuation-In-Part application of International Patent Application No. PCT/EP2007/005342, filed on Jun. 18, 2007, which claims priority from Federal Republic of Germany Patent Application No. 10 2006 028 266.3, filed on Jun. 20, 2006. International Patent Application No. PCT/EP2007/005342 was pending as of the filing date of this application. The United States was an elected state in International Patent Application No. PCT/EP2007/005342.

BACKGROUND

1. Technical Field

The present application relates to a method for the handling of containers using a rotary-type container handling machine with at least one rotor driven to rotate around a vertical machine axis, whereby the handling of the containers takes place on the rotor and the containers are transferred sequentially for this purpose at least one container inlet to the rotor and moved with said rotor over at least a partial length of a first track encircling the vertical machine axis and whereby the handled containers are removed from the rotor at least one container outlet, and a container handling machine of the rotary type for the handling of containers, having at least one rotor with container receptacles driven to rotate around a vertical machine axis, whereby the containers to be handled are sequentially transferred at least one container inlet to the container receptacles moved past said container inlet on a first track encircling the vertical machine axis and the containers are removed from the container receptacles at least one container outlet after handling.

2. Background Information

Background information is for informational purposes only and does not necessarily admit that subsequently mentioned information and publications are prior art.

"Container" within the meaning of the present application refers in one possible embodiment to bottles, cans, tubes and other containers that are suitable and/or are used as packaging for a wide variety of products, for example for liquid and/or pasteous products.

"Handling" within the meaning of the present application refers to a wide variety of handling functions with containers, such as the cleaning of the containers with the handling machine configured as e.g. a rinser; the sterilization of the containers with the handling machine configured as a sterilizer; the filling of the containers with the handling machine configured as a filling machine; the labeling and/or printing of the containers with the machine configured as a labeling machine; the closing or sealing of the containers with the machine configured as a sealing machine, etc., but other types of handling are also plausible.

The machines used for the handling, and often the high-volume handling, of such packaging or containers are rotary-type handling machines, possibly machines with a rotor driven to rotate continuously or timed around a vertical machine axis, on which rotor the handling of the container takes place between a container inlet and a container outlet during the rotation of the rotor. Some handling machines have handling stations at the circumference of the rotor distributed in equal angular intervals around the vertical machine axis, which handling stations each include inter alia a container receptacle for holding a container and other functional elements specific to the type of handling. The containers are delivered to the respective handling station or container receptacle located there at the container inlet in the form of a starwheel, for example. At the container outlet, for example also in the form of a starwheel, the handled containers are removed from the individual container receptacles for further use or handling. The handling takes place in the rotational angle area of the rotor between the container inlet and the container outlet. For design reasons as well as due to the space required or desired for the delivery and removal of the containers, this angle area is less than three hundred sixty degrees and under optimal conditions is roughly three hundred thirty degrees.

At the high volumes required or desired for rotary-type handling machines, this restricted rotational angle area of the rotor available for handling results in extremely large rotor diameters to enable sufficient handling time at high volumes and thus at a high rotor speed. It is therefore not uncommon for higher volume filling machines to have rotor diameters on the scale of seven and a half meters.

To achieve a high volume (large number of processed containers per unit time) at reduced rotor speed, some container handling machines with which the handling stations on the rotor driven to rotate around the vertical machine axis are arranged in multiple, circular tracks encircling this machine axis at various radial distances from the machine axis. The containers are delivered as a multi-track container stream to the container inlet of the handling machine in such a manner that each track of the delivered container stream is assigned to one track on the rotor, i.e. that containers in each track of the delivered container stream move onto their own track on the rotor or onto a container receptacle rotating along this track. Analogously, the processed containers are removed from the tracks of the rotor at the container outlet and delivered as a multi-track container stream for further use or handling. The handling of each container again takes place between the container inlet and the container outlet in the rotation angle area of the rotor, which is less than three hundred sixty degrees. Although the simultaneous or substantially simultaneous handling of a plurality of containers on multiple tracks of the rotor represents an improvement over machines with which the container receptacles or the container handling stations are located on a single track at the circumference of the rotor, the multi-track delivery and removal of the containers requires or desires a complex and fault-prone design.

OBJECT OR OBJECTS

The object of the present application is to demonstrate a method that enables high volumes on a handling machine having a reduced rotor diameter, with a simplified design of both the container inlet and the container outlet.

SUMMARY

This object may be achieved by a method for the handling of containers using a rotary-type container handling machine with at least one rotor driven to rotate around a vertical machine axis. The handling of the containers takes place on the rotor and the containers are transferred sequentially for this purpose at least one container inlet to the rotor and moved with the rotor over at least a partial length of a first track encircling the vertical machine axis. The handled containers are removed from the rotor at least one container outlet. The containers, during handling, are moved by the rotating rotor by means of at least one track change over at least a partial length of at least one additional track encircling the vertical machine axis. This object may also possibly be achieved by a container handling machine of the rotary type for the handling of containers, having at least one rotor with container receptacles driven to rotate around a vertical machine axis. The containers to be handled are sequentially transferred at least one container inlet to the container receptacles moved past at least one container inlet on a first track encircling the vertical machine axis and the containers are removed from the container receptacles at least one container outlet after handling. The container receptacles can be moved relative to the vertical machine axis or to the rotor to effect a track change so that the containers arranged on the container receptacles are moved by the rotating rotor along at least a partial length of at least on additional track encircling the vertical machine axis by means of at least one track change.

According to at least one possible embodiment of the present application, the containers are delivered as a single-track stream to at least one container inlet, from where they are transferred to container receptacles moving past on the first track. At the container outlet, the containers are removed sequentially in the same manner from the container receptacles moving past in the manner a single-track container stream, and in one possible embodiment again from those container receptacles moving past the container outlet on the first track. During handling, each container or each container receptacle together with the container located there changes tracks on the rotating rotor at least once so that each container does not reach the container outlet after the one rotation of the rotor through an angle area of less than three hundred sixty degrees, for example three hundred thirty degrees, but rather after a rotation of the rotor that is significantly greater than this angle area, such as a rotor rotation of approximately three hundred thirty degrees plus three hundred sixty degrees or some multiple of three hundred sixty degrees. This enables a sufficiently long handling time even at a high handling machine volume and thus a high speed of rotor rotation, and with the advantage that the proven and reliable delivery and/or removal of the containers as a single container stream can be retained.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Further possible embodiments of the present application are disclosed herein at least one possible embodiment of the present application is described in greater detail below illustrated with the accompanying drawings, in which.

DESCRIPTION OF EMBODIMENT OR EMBODIMENTS

Figure 1:
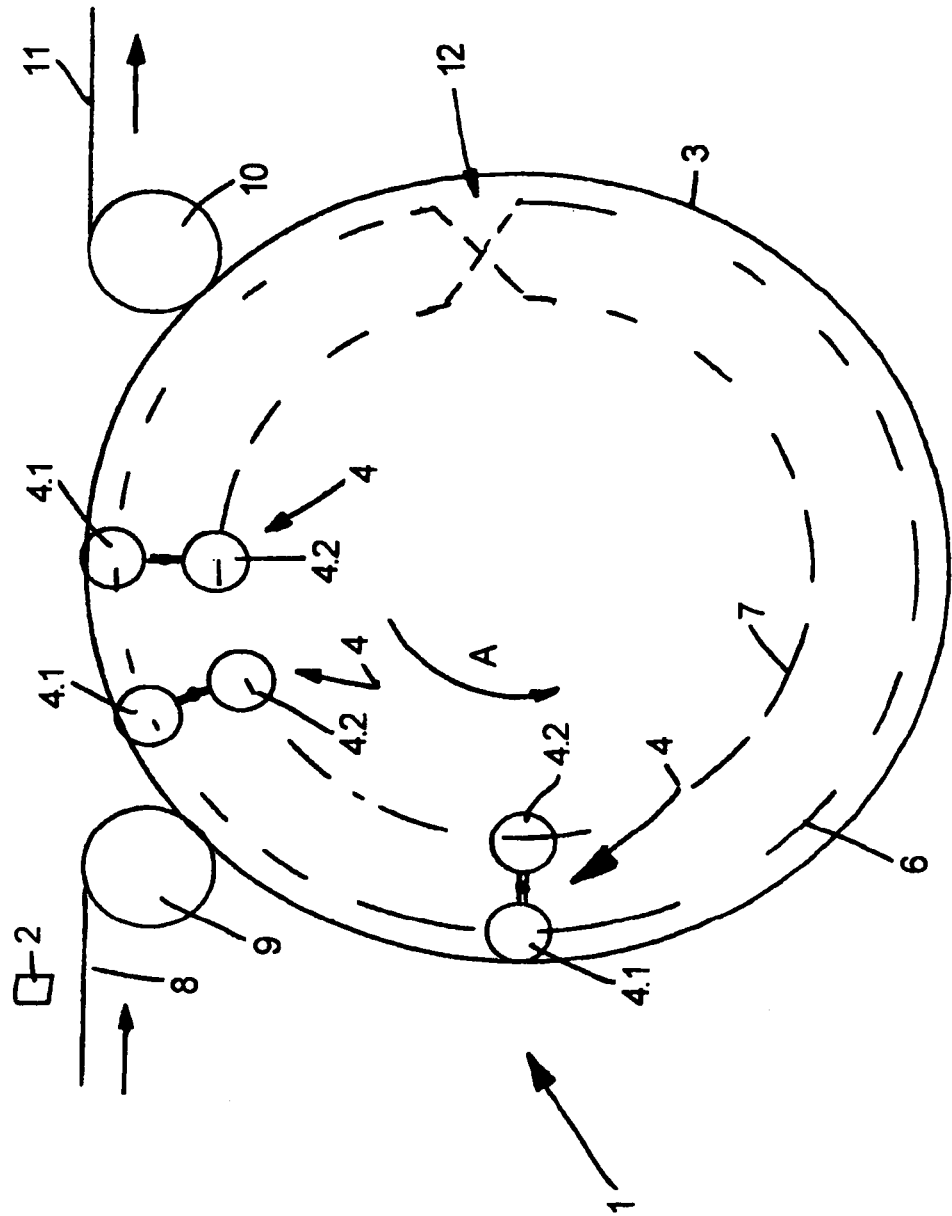
FIG. 1 shows schematically and in plan view a multi-track container handling machine of the rotary type for the handling of bottles, cans or similar containers.
Figure 2:
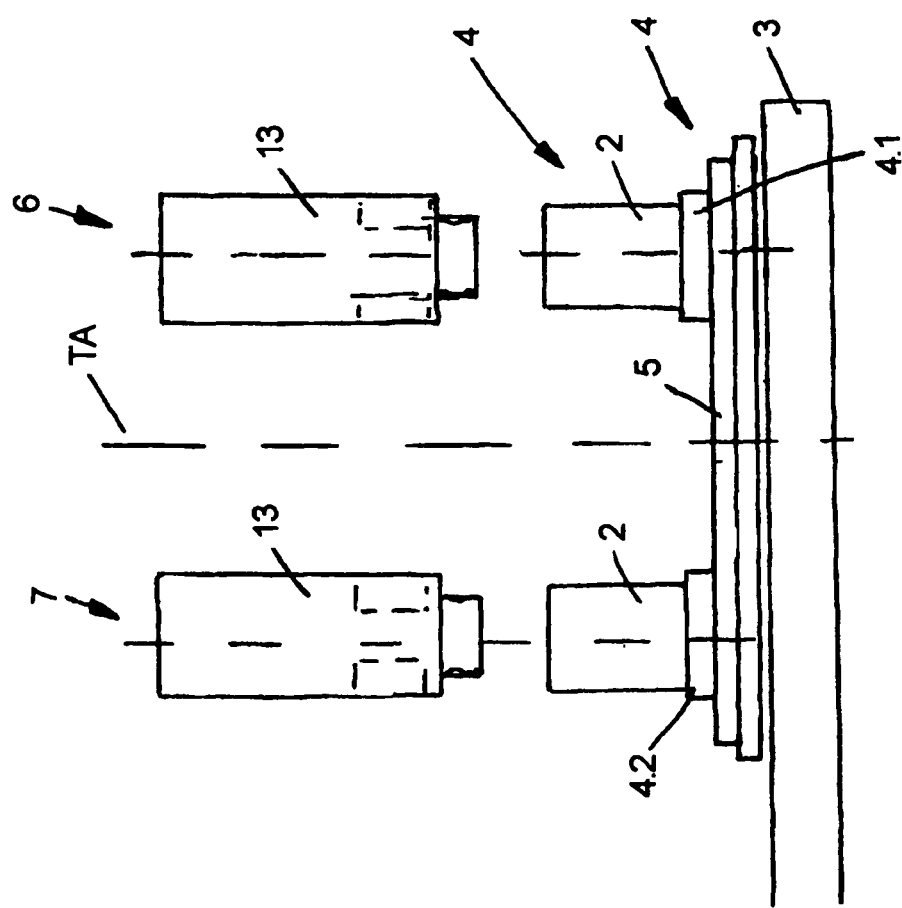
FIG. 2 shows one of the container receptacle units of the container handling machine shown in FIG. 1 with the machine configured as a filling machine.
Figure 3:
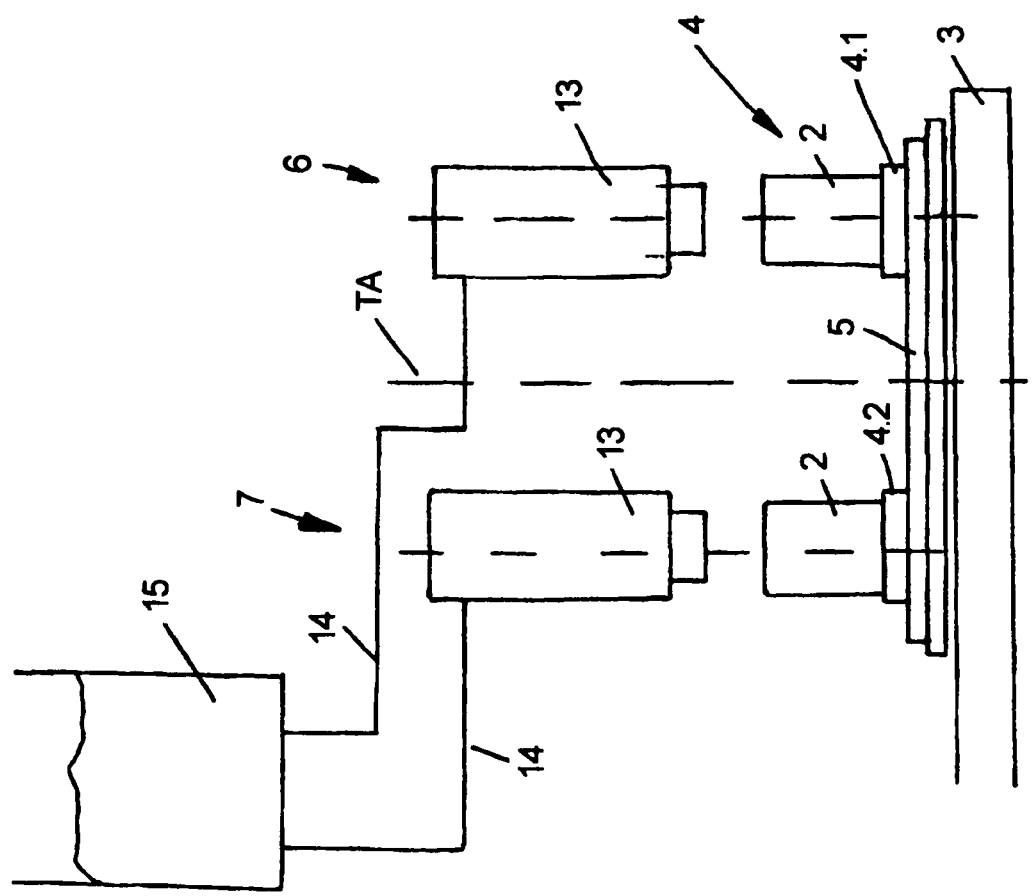
FIG. 3 shows a representation as in FIG. 2 with filling elements associated with each container receptacle and that move together with said receptacle when changing tracks.

The container handling machine designated as a whole as 1 in FIG. 1 is used to process containers 2, which are represented in FIGS. 1 through 3 as cans. The container handling machine 1 comprises inter alia a driven rotor 3 rotating as represented by arrow A continuously or non-continuously or timed around a vertical machine axis, which rotor has on its circumference and arranged at equal angular intervals around vertical machine axis multiple container receptacle units 4, each having two container receptacles 4.1 and 4.2. In the embodiments shown, these are configured as carrier plates on which the containers 2 are held in a suitable manner with the bottom of the containers facing up during handling, namely with their container axis oriented vertically.

The two container receptacles 4.1 and 4.2 of each container receptacle unit 4 are each located on a carrier element 5, and in the embodiment shown, diametrically opposite one another relative to a vertical carrier element axis TA parallel or virtually parallel to the machine axis and at the same radial distance to this axis TA. By means of a drive not shown in the figure, each container receptacle unit 4 or its carrier element 5 can be rotated or swivelled by control action so that in one end position of the swivel or rotary motion, the container receptacles 4.1 are radially farther outside than the container receptacles 4.2 relative to the vertical machine axis, and in the other end position of the swivel and rotary motion the container receptacles 4.2 are radially farther outside than the container receptacles 4.1.

Thus as the rotor 3 rotates, those container receptacles 4.1 or 4.2 located farther outside relative to the vertical machine axis move along an outer path or track 6, and those container receptacles 4.2 or 4.1 located farther inside relative to the vertical machine axis move along an inner path or track 7, where both tracks 6 and 7 are circular and surround the vertical machine axis.

The containers 2 to be processed are delivered via a conveyor 8 and are transferred individually via a starwheel 9 forming container inlet to one of the container receptacles 4.1 or 4.2 moving past the starwheel 9 on the outer track 6. Each of the processed containers 2 are removed by a starwheel 10 forming the container outlet from the container receptacles 4.1 or 4.2 moving past this starwheel on the outer track 6 and forwarded to a conveyor 11 for transporting away the processed containers 2.

In at least one possible embodiment according to the present application, the container handling machine 1 is controlled in such a manner, for example, that each container 2 transferred e.g. to a container receptacle 4.1 by the starwheel 9 reaches the starwheel 10 and is forwarded to the conveyor 11 after nearly two complete rotations of the rotor 3, i.e. after traveling the transport path comprising tracks 6 and 7.

A container 2 placed on the radially outward container receptacle 4.1 of an observed container receptacle unit 4 when passing the starwheel 9 and moved along track 6 by the rotating rotor 3 reaches together with its container receptacle 4.1 a changeover position 12, which for example lies in the direction of rotation A of the rotor 3 upstream of the container outlet comprising the starwheel 10. At this changeover position, the container receptacle unit 4 is rotated or swivelled one hundred eighty degrees around its axis TA so that the container 2 previously moved with container receptacle 4.1 along the outer track 6 now moves with its container receptacle 4.1 along the inner track 7 and is thus outside the area of action of starwheel 10. As it moves past the starwheel 10, the processed container now located on the radially outside container receptacle 4.2 of the observed container receptacle unit 4 and moving along track 6 can be removed and forwarded to the conveyor 11.

As the rotor 3 continues to rotate, the observed container receptacle unit 4 again moves into the area of action of the starwheel 9, at which a new container 2 to be processed can be placed on the outside container receptacle 4.2. As soon as rotation of the rotor 3 returns the observed container receptacle unit 4 to the changeover position 12, the observed container receptacle unit 4 is again rotated or swivelled one hundred eighty degrees around the axis TA so that the container 2 on the container receptacle 4.1, which is now again on the outside and moving along track 6, can be transferred by the starwheel 10 to the conveyor 11.

The containers 2 are delivered via the conveyor 8 as a single-track container stream, transferred by the starwheel 9 one after the other in the manner of a single-track container stream to the container receptacles, removed sequentially in the manner of a single-track container stream from the container receptacles and transported away as a single-track container stream via the conveyor 11.

The handling of each container 2 thus takes place on two tracks 6 and 7, i.e. over a distance equivalent to nearly two rotations of the rotor 3. This makes it possible to achieve a high volume (number of containers 2 processed per unit time) with a rotor 3 having a reduced size and thus with less space required or desired for the container handling machine 1, and that with a relatively simple design. The rotation or swiveling of the container receptacle unit 4 around its axis TA is either positively actuated by the rotation of the rotor 1 via gears and/or turn controllers or via independent, in one possible embodiment randomly controllable drives with respect to speed, angle and direction of rotation.

Figure 1A:
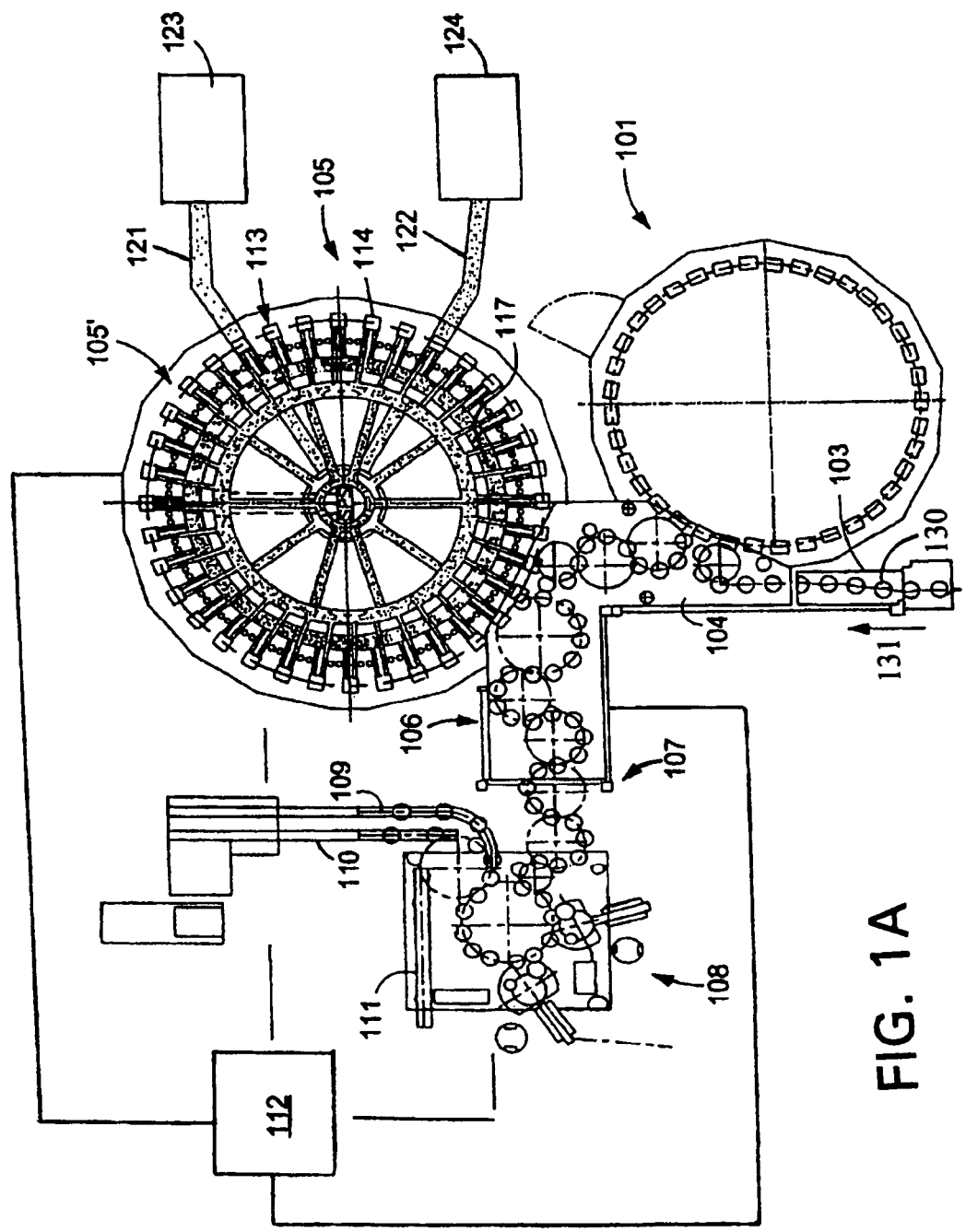
FIG. 1A shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 1A shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

As shown in FIG. 2, if the container handling machine 1 is a filling machine, multiple filling elements 13 are provided above each track 6 and 7 and distributed at angular intervals around the vertical machine axis. These filling elements 13 rotate with the rotor 3. In this embodiment, two filling elements 13 are associated with each container receptacle unit 4, one filling element 13 above track 6 and one filling element above track 7, so that these filling elements 13 are located precisely or generally over the container receptacles 4.1 and 4.2, respectively, in the end positions of the swivel or rotary motion of the container receptacle units 4. The number of filling elements distributed along the two tracks 6 and 7 is therefore equal to the number of container receptacles 4.1 and 4.2 per container receptacle unit multiplied by the number of these units.

After a container 2 is transferred to a container receptacle 4.1 moving along track 6, for example, this container 2 is partly filled during a first filling phase by the filling element 13 associated with track 6. The filling process is interrupted before the changeover position 12 is reached. After the track change, the filling process for the container 2, which is still located on container receptacle 4.1 but is now moving along track 7, is continued in a second filling phase with the filling element 13 associated with this track 7 until the changeover position 12 is reached again. After changing tracks again, the container 2 now moving along track 6 again on the container receptacle 4.1 can be topped up before reaching the starwheel 10. The metered quantities of product filled into the respective container during the two filling phases are added so that the quantity required or desired to top up the container 2 can be very precisely or generally observed. Those containers 2 transferred by the starwheel 9 to the container receptacles 4.2 are filled analogously.

Other methods are also possible, of course, such as prehandling of the containers on track 6 or a section of this track and filling on track 7, etc.

FIG. 3 shows in a representation as in FIG. 2 another embodiment in which the filling elements 13 associated with each container receptacle unit 4 are each located above a container receptacle 4.1 and 4.2 and can be swivelled with the container receptacle unit 4 when this is swivelled around its axis TA. The filling elements 13 are connected to the annular vessel 15 comprising the liquid product and located on the rotor 3 via flexible lines 14 (e.g. hoses).

This embodiment, in which not only the container receptacles 4.1 and 4.2 but also the other function elements of each handling station are swivelled around the respective axis TA for the change between tracks 6 and 7, has the advantage that the handling of a container 2 does not have to interrupted when changing tracks, i.e. at the changeover position 12, but can be performed continuously so that the time available for the respective handling at a certain speed of the rotor 3 is significantly increased versus the embodiment in FIG. 2. Rather than a connection of the filling elements 13 via hoses 14, a rotary distributor connecting each filling element 13 to the annular vessel 15 can be provided, where this rotary distributor can also have a control function.

Figure 3A:
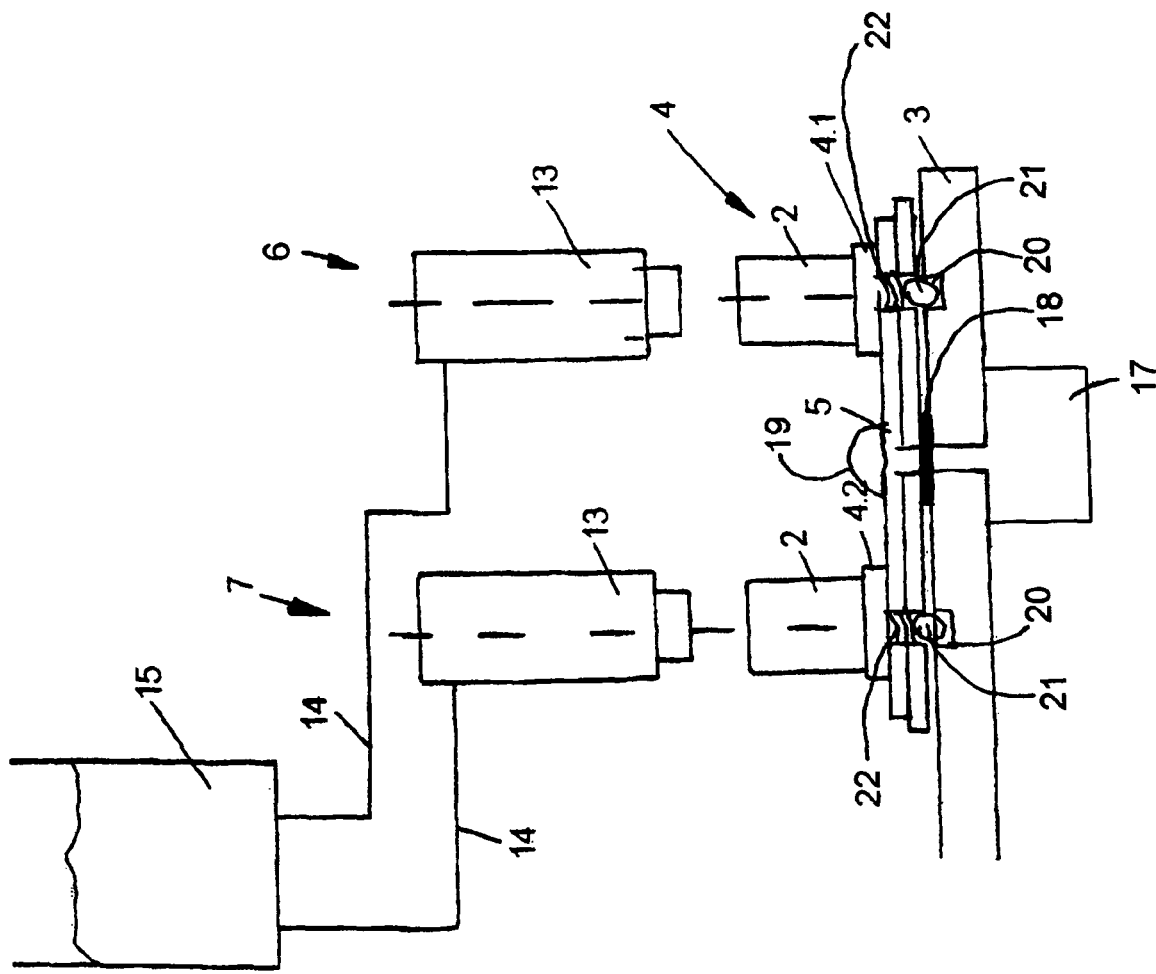
FIG. 3A shows the view shown in FIG. 3 with additional features according to at least one possible embodiment.

In one possible embodiment, as illustrated in FIG. 3A, the rotation of the container receptacle unit 4 around its axis TA is actuated by a step motor 17. A step motor or stepper motor is a brush less, synchronous, electric motor that can divide a full rotation into a specific number of steps or positions. The step motor could be mounted at the bottom of the axis TA under the rotor 3 and protected by a spill guard 19. The step motor 17 would rotate the container receptacle 4, which could rotate on a carrier bearing 18 one hundred eighty degrees between two preset positions, one hundred twenty degrees between three preset positions, or ninety degrees between four preset positions, depending on which embodiment or configuration is used. In FIG. 3A, the filling elements 13 are stationary, thus requiring an accurate ending position of the rotation of the container receptacle 4. A locking device of some sort may be used to essentially ensure or promote proper alignment of the container receptacles 4 beneath the filling elements 13, as well as to essentially ensure or promote proper alignment of the container 2 with the corresponding track 6 and 7. As shown in FIG. 3A, this locking device, for example, could be a mechanical device comprising a ball bearing 21, a recessed slot or track 20 for the bearing 21 to fit down into, and a bearing spring 22 to put pressure on the bearing 21 and force it down into the bearing slot 20 to thereby lock the container receptacles 4 in place. An electric brake could also be used to maintain the accurate ending position of the container receptacles 4 at the ending position of their rotation.

Figure 3B:
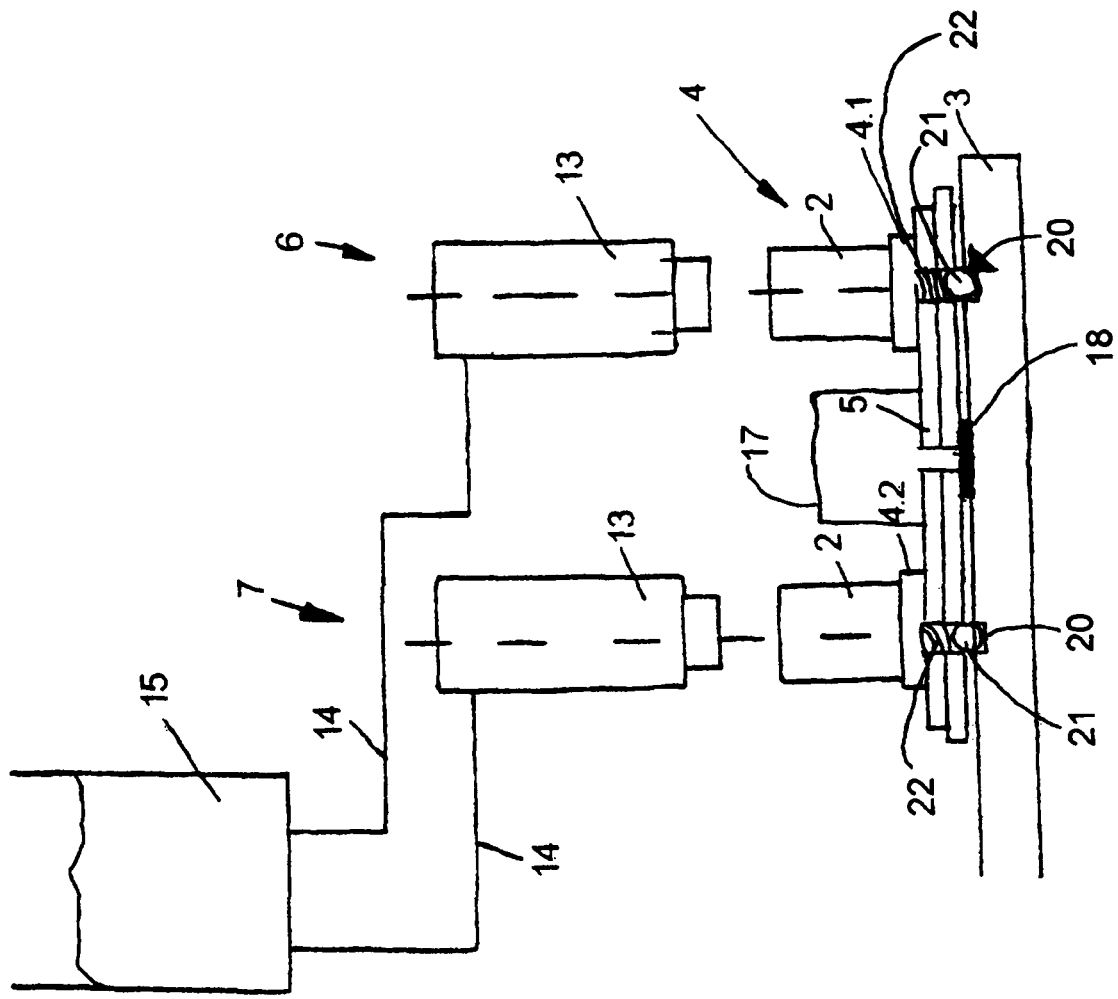
FIG. 3B shows the view shown in FIG. 3 with additional features according to another possible embodiment.

In another possible embodiment, as illustrated in FIG. 3B, the step motor 17 is mounted above the rotor 3 rather than below the rotor 3 as shown in FIG. 3A.

Figure 3C:
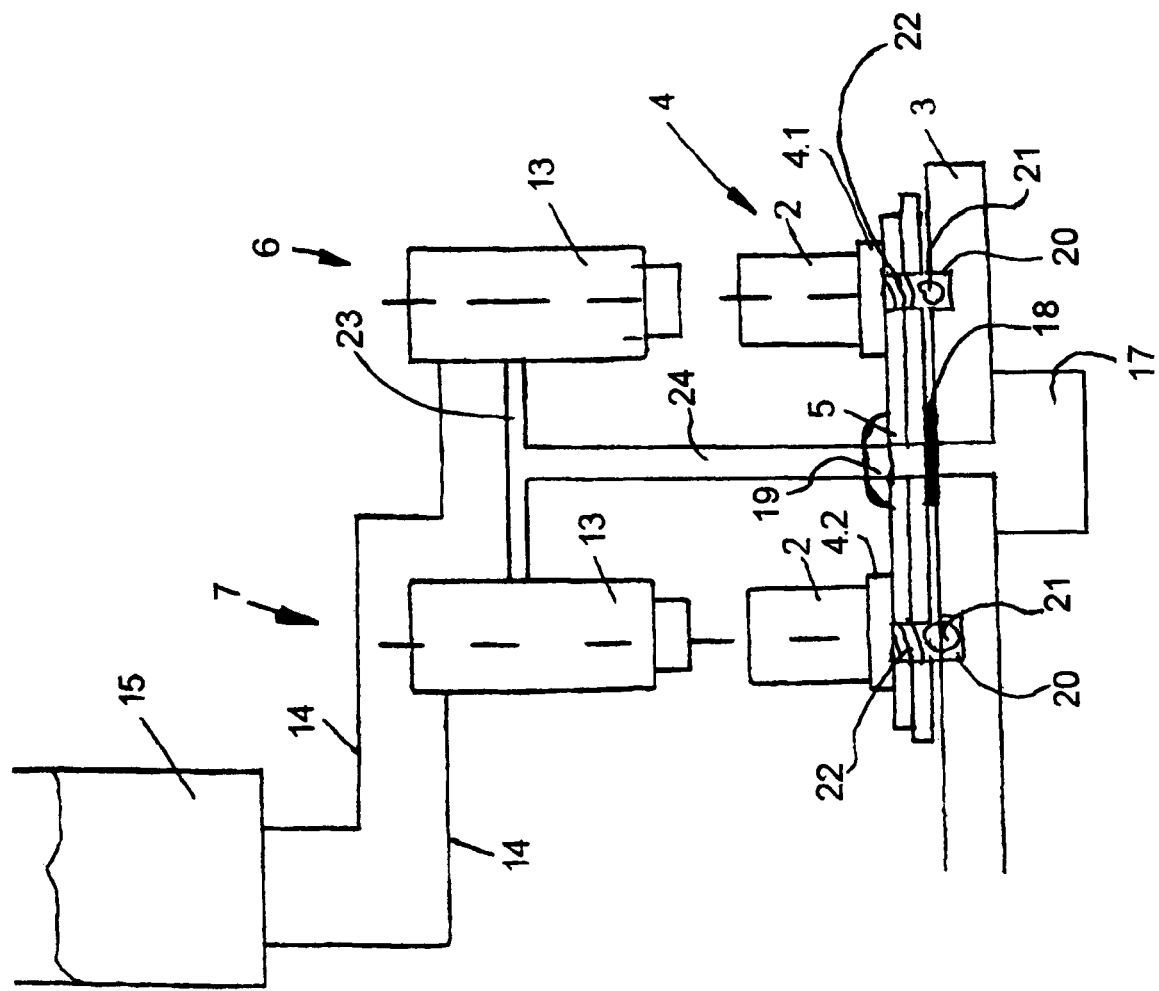
FIG. 3C shows the view shown in FIG. 3 with additional features according to yet another possible embodiment.

In the embodiment as illustrated in FIG. 3C, the step motor 17 is mounted under the rotor 3. The step motor 17 would rotate the container receptacle 4 with the filling elements 13, thereby maintaining the alignment of the two components. A vertical bar 24 connected to the container receptacle 4 at the bottom, with a horizontal top bar 23 connected to the filling elements 13 could be utilized to connect the filling elements 13 to the container receptacle 4 and ensure proper alignment. A locking device of some sort, either mechanical or electrical could be used in this configuration to essentially ensure or promote proper alignment of the containers 2 with the corresponding track 6 and 7.

Figure 3D:
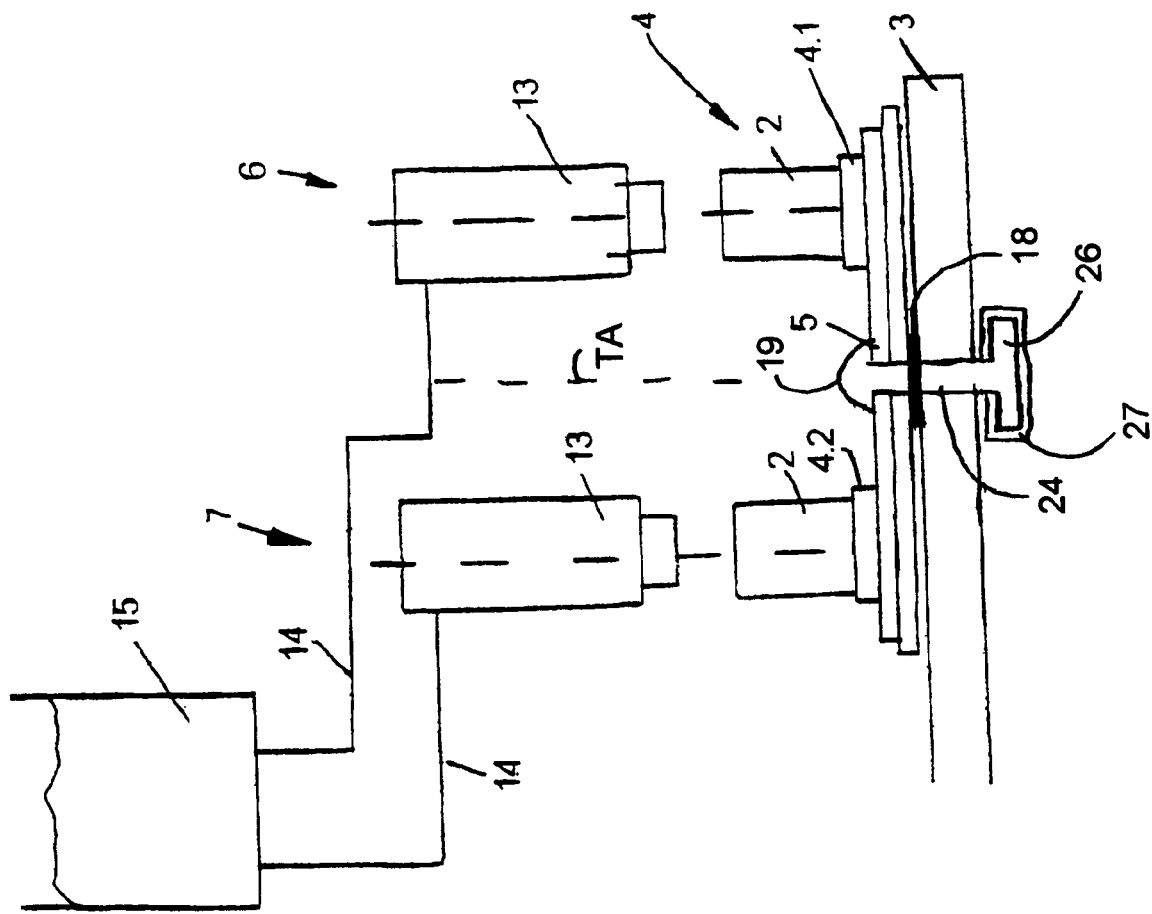
FIG. 3D shows the view shown in FIG. 3 with additional features according to still another possible embodiment.

In the embodiment as illustrated in FIG. 3D, the rotation of the container receptacle unit 4 around its axis TA is actuated by a cam 26 and cam guiding track system 27. The cam 26 is mounted under the rotor 3 along vertical axis TA on shaft 24 essentially parallel to the axis around which the rotor 3 rotates. In this embodiment, no electrical parts or motors are used for the rotation of the container receptacle unit 4 when it reaches the changeover position 12. The cam 26 and guide and or track system 27 is a design that could possibly eliminate the use of a locking mechanism, such as an electrical brake or the mechanical system described using a locking ball bearing 21, a recessed slot or track for the lock bearing 20, and the bearing spring 22. The cam guide 27 would control the position of the cam 26 thereby controlling the position of the container receptacle 4, as the cam 26 is mounted on the bottom of the shaft 24 which is mounted to the container receptacle 4.

Figure 3E:
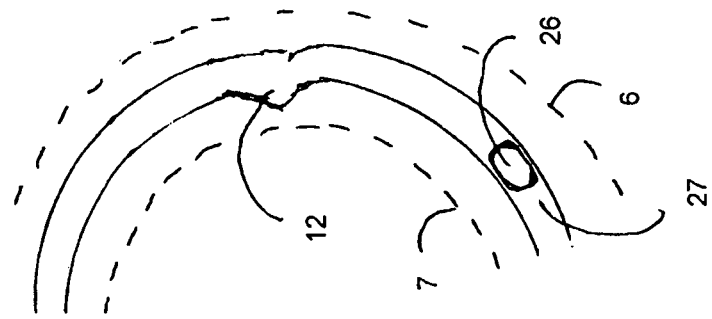
FIG. 3E shows an overhead view of the cam track system as described in FIG. 3D.
Figure 6:
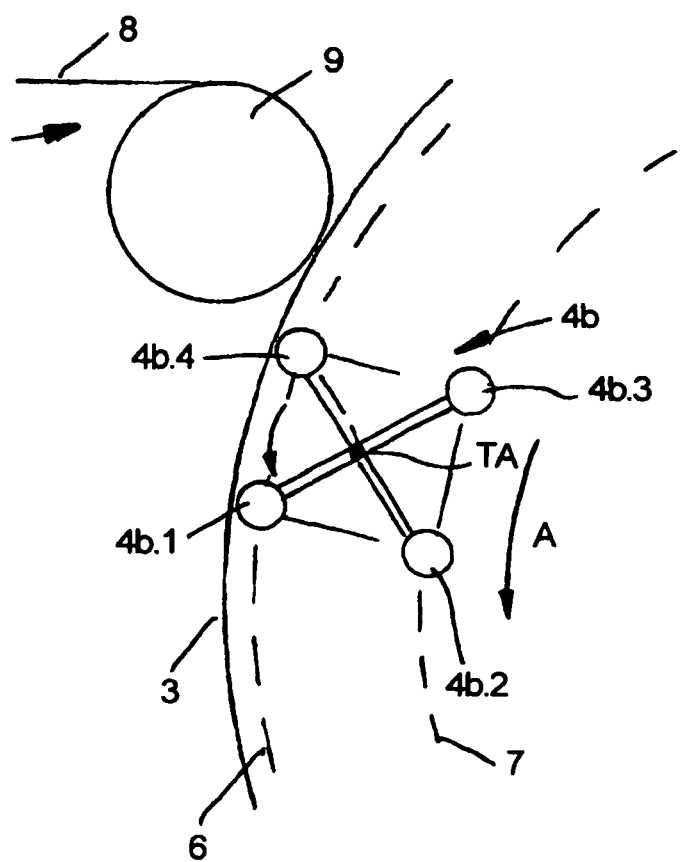

The embodiment as illustrated in FIG. 3E is representative of a top view of the cam guide or track system 27 as described in the previous embodiment. This figure shows an embodiment, as illustrated in FIG. 6 showing tracks 6 and 7 with the cam guide or track system 27 in between directly below the rotor 3 and at the bottom of the axis TA.

Figure 3F:
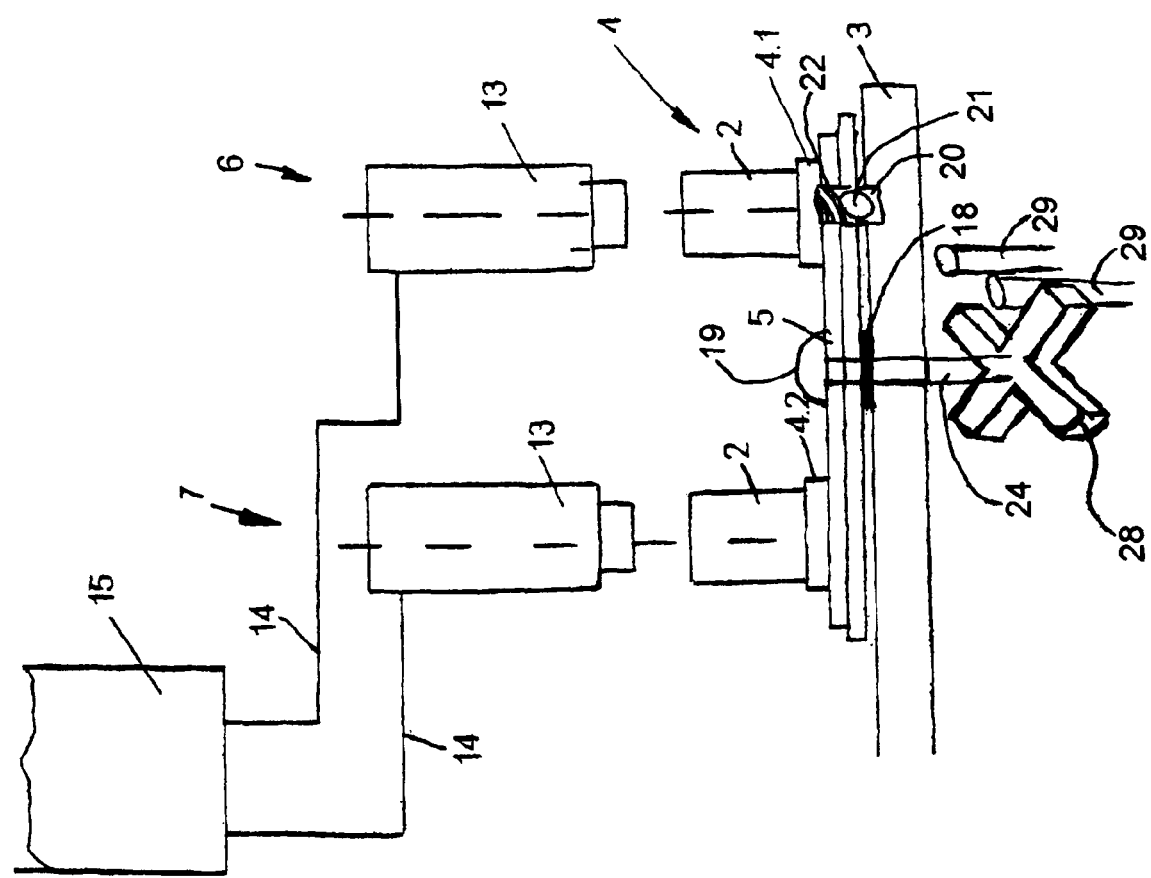
FIG. 3F shows the view shown in FIG. 3 with additional features according to another possible embodiment.

In the embodiment as illustrated in FIG. 3F, the rotation of the container receptacle 4 around its axis TA is actuated by a cross bar unit 28 and a stationary cross bar changeover peg unit 29. The cross gear 28 is mounted under the rotor 3 on a shaft 24 along vertical axis, TA. In this embodiment, no electrical parts or motors are used to actuate the rotation of the container receptacle 4 when it reaches the changeover position 12. Instead, the cross gear 28, which is mounted on a shaft 24 is rotated on its axis TA after it enters the changeover position 12 and strikes the stationary changeover peg 29. Changeover peg 29 is mounted securely beneath the rotor 3. Two pegs 29 could be used to effectuate a one hundred eighty degree rotation, as contact with each peg 29 produces a ninety degree rotation. A locking mechanism of some kind could be used in this configuration. A ball bearing system, as described in previous embodiments, an electric brake, or any type system that accomplishes the task of locking the container receptacle 4 in place directly beneath the filling element 13 would be sufficient.

Figure 4:
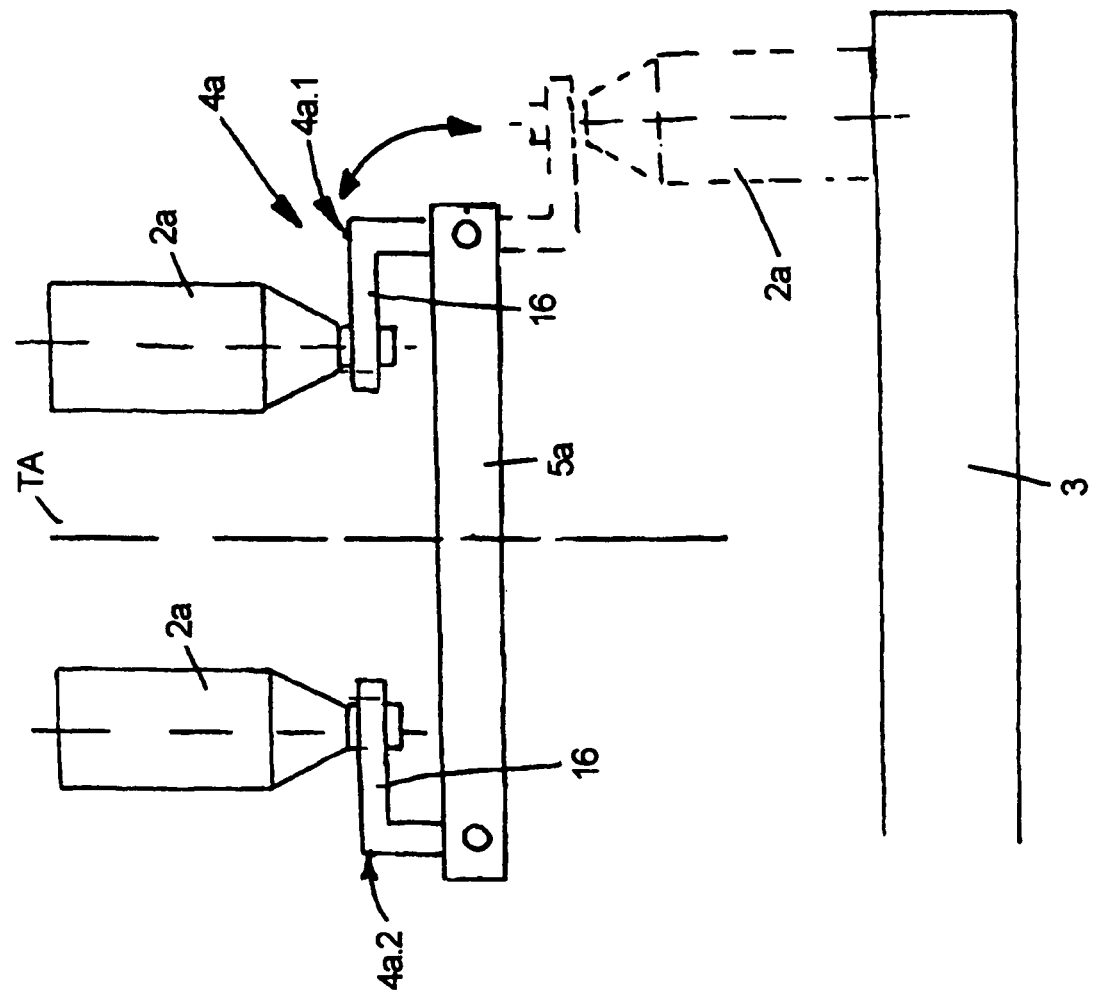
FIG. 4 shows a container receptacle unit for the overhead handling of bottles according to another embodiment.

FIG. 4 shows in highly schematic form and in a representation similar to FIGS. 2 and 3 a container receptacle unit 4a of a machine for the handling of containers 2a in the form of bottles. Similar to as was described for the container receptacle unit 4, the container receptacle unit 4a together with a plurality of identical container receptacle units 4a is located on the periphery of the rotor 3 rotating around the vertical machine axis. Each container receptacle unit 4a has two container receptacles 4a.1 and 4a.2, each comprising a swivel arm 16 with gripper on the carrier element 5a. Each swivel arm 16 is configured so that it grips and securely holds the container 2a to the processed in the vicinity of the container or bottle opening, i.e. on the bottle neck. The swivel arms 16 can each be swivelled around a horizontal axis that is tangential to the direction of rotation A of the rotor 3. With the swivel arms 15 the containers 2a can be swivelled from a normal position, in which the container opening is at the top, into a handling or top down position in which the containers 2a are held with their container opening at the bottom, and in each case with the container axis vertically oriented.

For handling the containers 2a are moved upside down along tracks 6 and 7, with again at least one track change occurring during handling at changeover position 12 by rotating or swiveling the container receptacle units 4a or the carrier elements 5a around their carrier axis TA parallel or virtually parallel to the vertical machine axis. The transfer of each container 2a to the container receptacle 4a.1 or 4a.2 moving along track 6 occurs in the normal position (with the container opening up) at the container inlet. Each processed container 2a is also in this normal position when discharged at the container outlet. In this embodiment, the containers 2a change tracks twice during handling, for example, as this was described above with reference to FIG. 2. In this embodiment, the containers 2a are again delivered to the machine or container inlet as a single-track container stream. At the container outlet, the processed containers 2a are removed individually and one after the other from the rotor 3 or the container receptacles 4a.1 or 4a.2 and discharged from the machine as a single-track container stream.

Figure 4A:
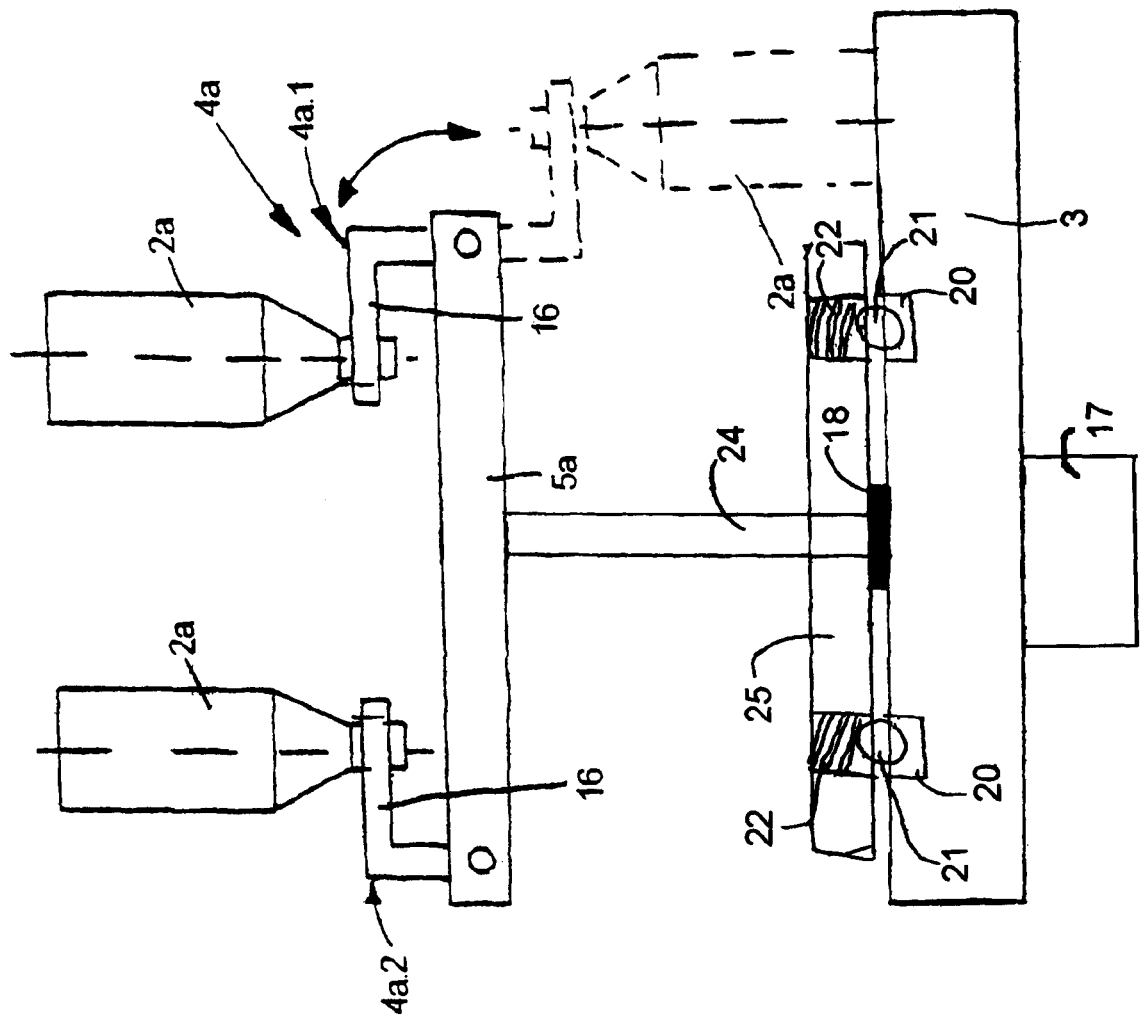
FIG. 4A shows a container receptacle unit for the overhead handling of bottles according to another embodiment.

In the embodiment as illustrated in FIG. 4A, the movement of the container receptacle 4 is facilitated by components as described in previous embodiments. In this embodiment the step motor 17 is mounted below the rotor 3. The container receptacles 4 have a vertical extension 24 connected to a container receptacle 5a at the top which is also connected to a swivel arm 16. Connected to the container receptacle 5a, is the swivel arm 16 which holds the containers 2 by their necks and facilitates the rotation of them one hundred eighty degrees from an upside down or rinsing position to a right side up or filling position.

Figure 4B:
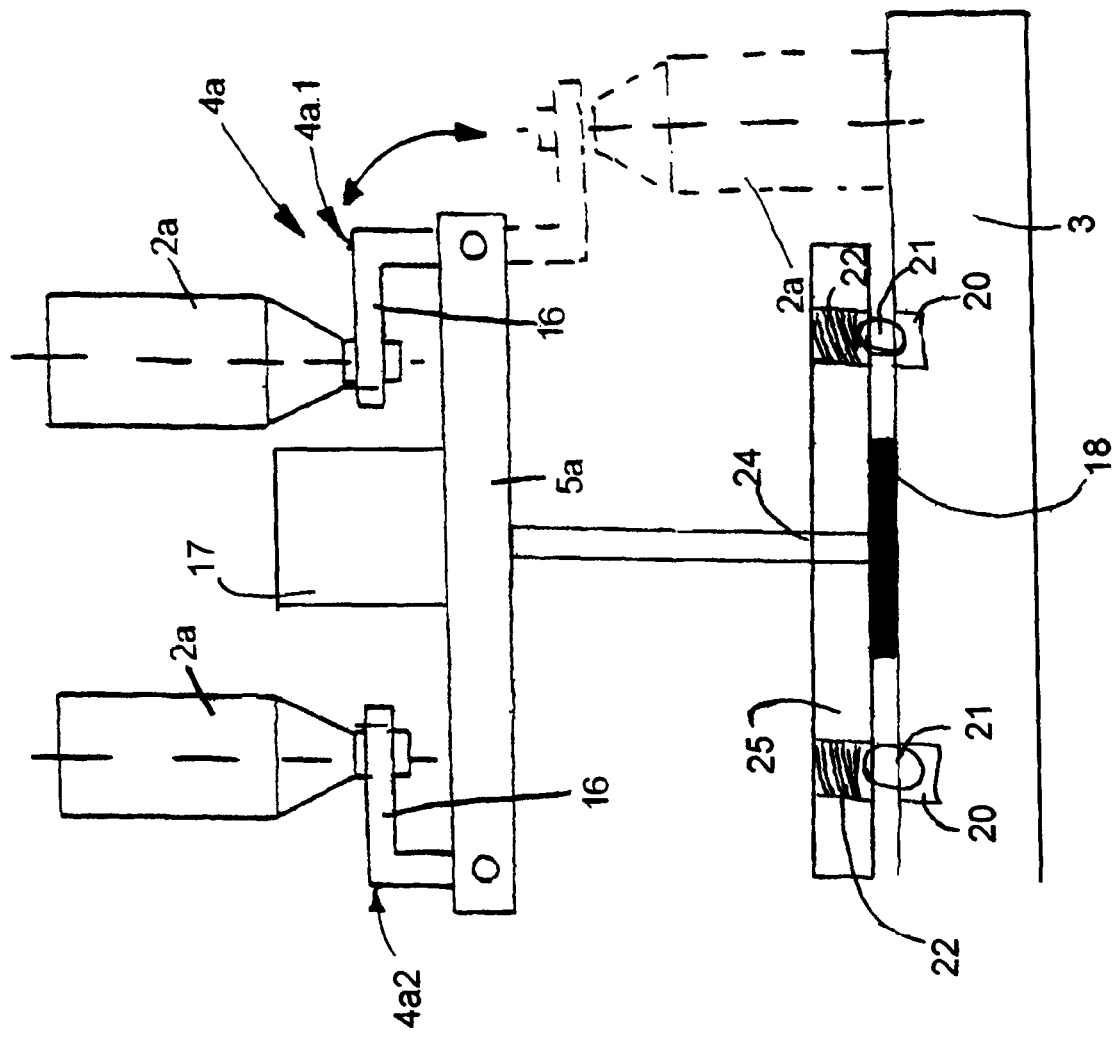
FIG. 4B shows a container receptacle unit for the overhead handling of bottles according to yet another embodiment.

In the embodiment as illustrated in FIG. 4B, the movement of the container receptacle 4 is facilitated by components as described in previous embodiments. The step motor 17 is mounted above the upper container receptacle 5a. The shaft 24 of the step motor 17 would be securely mounted beneath the rotor 3 thereby allowing the rotation of the lower container receptacle 4, the upper container receptacle 5a, and the step motor 17. The containers 2 can also be rotated from an upside down or a rinsing position to a right side up or a filling position.

FIGS. 1 through 4 relate to embodiments in which each container receptacle unit 4 or 4a has two container receptacles 4.1, 4.2 or 4a.1 and 4a.2. It is possible, of course, to design the container receptacle units in such a way that there are more than two container receptacles offset by the same radial distance around the receptacle axis TA.

Figure 5:
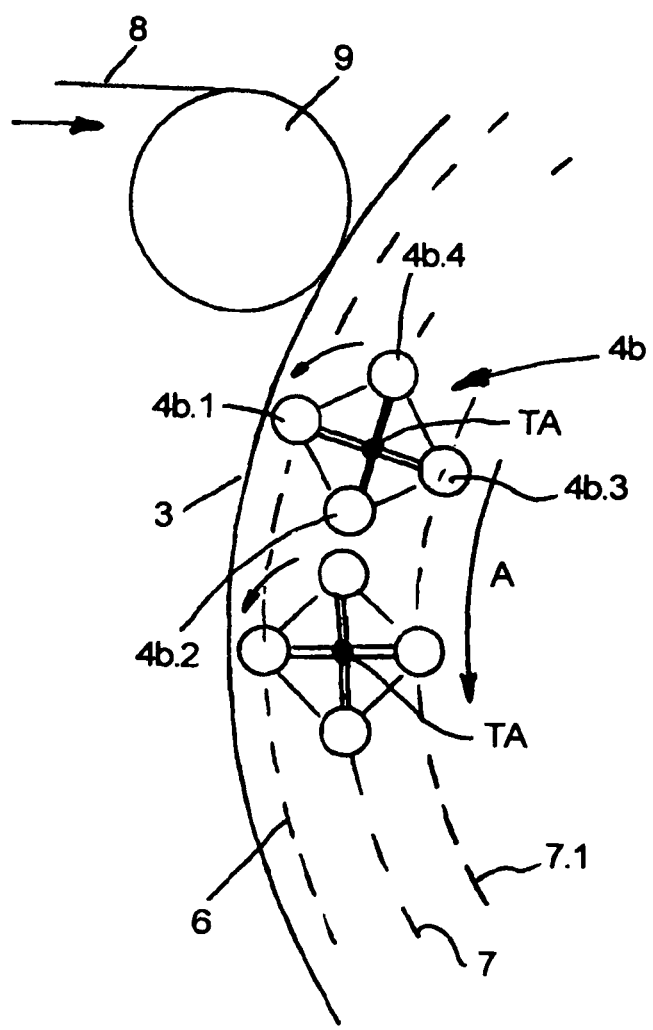
FIGS. 5 through 7 shows schematically portions of additional embodiments of a multi/track container handling machine.

FIG. 5 shows an embodiment in which the container receptacle units 4b located on the periphery of the rotor 3 correspond in terms of function to the container receptacle units 4 but have a total of four container receptacles 4b.1 through 4b.4. In this embodiment, the individual container receptacle units 4b are controlled such that each container receptacles in a container receptacle 4b.1 through 4b.4 moves with the rotating rotor 3 along three tracks a total of five times, namely first on the outer track 6, second on track 7 adjacent to and inside of track 6, third on track 7.1 adjacent to and inside of track 7 and fourth again on track 7 until after another track change the respective container returns fifth to track 6 at the container outlet.

The end positions of the swivel or rotary motion of the container receptacle units 4b around their axes TA are selected so that in each end position, one container receptacle is on track 6, another container receptacle is on track 7.1 and two container receptacles are one track 7, i.e. in the situation shown in FIG. 6, the container receptacle 4b.1 is on track 6, the container receptacle 4b.3 is on track 7.1 and the two container receptacles 4b.2 and 4b.4 are on track 7.

To explain the mode of action, a container receptacle unit 4b will again be observed and it is assumed that the container receptacle 4b.1 of this container receptacle unit is located on the outside track 6 as it passes by the container inlet (starwheel 9), i.e. a container is transferred to this container receptacle 4b.1 and undergoes the handling process associated with track 6.

As the rotor 3 rotates, this container receptacle unit 4b than reaches the changeover position 12, at which the container receptacle unit 4b is swivelled ninety degrees around its axis TA for the track change so that container receptacle 4b.1 is then on track 7, in one possible embodiment at the front of the container unit 4b relative to the direction of rotation A of the rotor 3, and the container in the receptacle undergoes the handling process associated with track 7 and the front position.

When the rotating rotor 3 again moves the observed container receptacle unit 4b to the changeover position 12, the container receptacle unit 4b is again rotated ninety degrees so that the container on container receptacle 4b.1 is now moving along the inside track 7.1 and undergoes the handling there. Upon again reaching the switching or changeover position 12, the container receptacle unit 4b is again rotated ninety so that the container receptacle 4b.1 and the container there return to track 7, but this time are in the rear position of the container receptacle unit 4b relative to the direction of rotation A of the rotor 3 so that the container located on container receptacle 4b.1 undergoes the handling process associated with track 7 and the rear position. This handling can be different than the handling at the front position.

The next time the changeover position 12 is passed, the container receptacle unit 4b is again rotated ninety so that track change returns the container receptacle 4b.1 with its container to track 6 and can be discharged from the machine at the container outlet.

Each container positioned at one of the container receptacles 4b.1 through 4b.3 of a container receptacle unit 4b thus moves along a total of four tracks during handling, namely once each on track 6 and track 7.1 and twice on track 7 so that the respective container is not discharged from the machine until after passing the changeover position four times. This results in an extremely long handling path even with a short diameter rotor 3 and a sufficiently long handling duration even at a high rotor 3 speed.

It will be understood that with this embodiment, too, a container is transferred to every other container set 4b.2 through 4b.4 that is moving along the outer track 6 as it passes the starwheel 9 comprising the container inlet, and that this container together with this container receptacle is moved along the various tracks 6, 7 and 7.1 in the same way as was described above for container receptacle 4b.1 of the observed container receptacle unit 4b.

FIG. 6 shows an embodiment which significantly differs from the embodiment in FIG. 5 in that the container receptacle units again designated 4b there are controlled such that in the end position of each swivel or rotary motion of the container receptacle units, two container receptacles, in the situation represented in FIG. 6 namely the container receptacles 4b.1 and 4b.4, are on track 6 and two container receptacles, in the situation represented in FIG. 6 namely 4b.2 and 4b.3, are on track 7. Each time the changeover position 12 is passed, each container receptacle unit 4b is swivelled either ninety degrees or one hundred eighty degrees around the axis TA for the track change.

In the first case (swivel ninety degrees), the corresponding machine is configured such that the transfer of a container to the container receptacle and the removal of a container from the container receptacle is possible if this container receptacle is on track 6 and is in a predetermined position relative to the other container receptacles of the respective container receptacle unit 4b, for example the position of the container receptacle 4b.1 in FIG. 6. In this embodiment, each of the containers on a container receptacle is moved during handling, i.e. between transfer to a container receptacle and discharge from the machine, along four tracks, namely first on track 6, then twice on track 7 and finally again on track 6.

In the second case (one hundred eighty degree swivel), the container receptacle units 4b are arranged in such a way on the periphery of the rotor 6 that the container receptacles 4b.1 through 4b.4 on the outer track 6 are the same distance apart, i.e. the distance between two container receptacles of each container receptacle unit 4b on the outer track 6 is also equal to the distance between consecutive container receptacles in the direction of rotation A of the rotor 3 of adjacent container receptacle units 4b. One container can be transferred to each container receptacle on track 6 moving past the starwheel 9 comprising the container inlet. Analogously, the processed container can be removed from the container receptacle on track six moving past the container outlet and discharged.

The handling of each container takes place on two tracks 6 and 7 with two track changes, so that this embodiment ultimately corresponds to the embodiment of FIG. 1, with the difference being that each container receptacle unit 4b has a total of four container receptacles 4b1 through 4b4 rather than two container receptacles.

Figure 7:
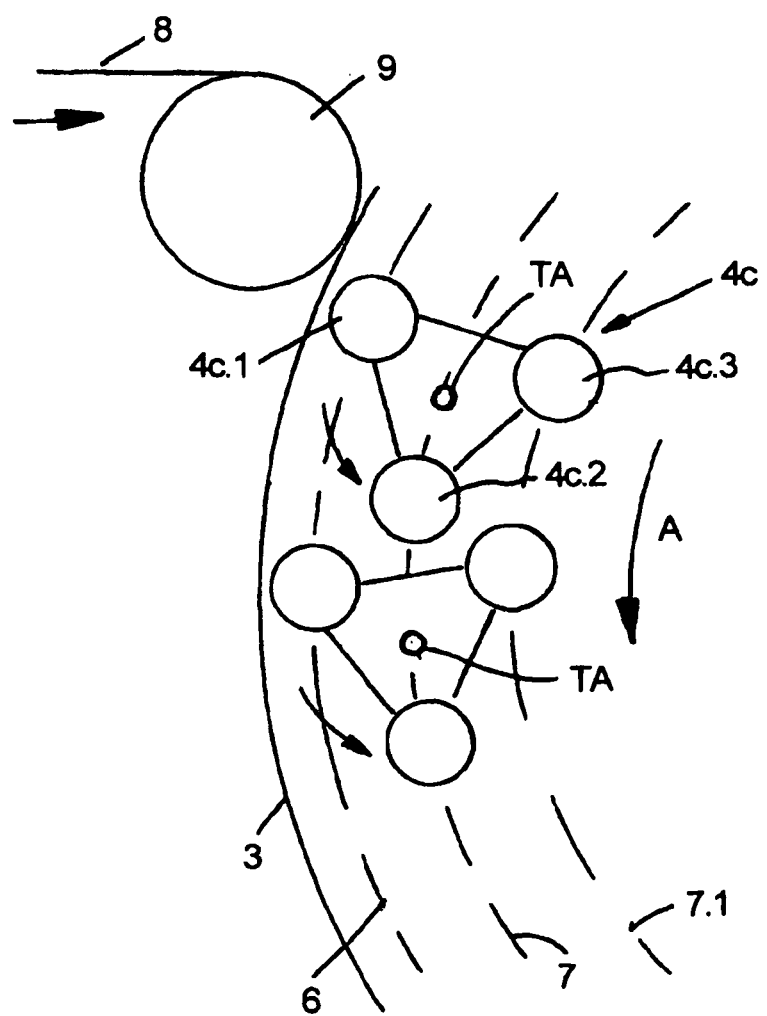

FIG. 7 shows a schematic representation of a further possible embodiment of a machine with container receptacle units 4c on the periphery of the rotor 3. Each container arrangement 4c has three container receptacles 4c.1, 4c.2 and 4c.3 offset one hundred twenty degrees from one another around the receptacle axis TA and at the same radial distance from this axis.

The processed containers in container receptacles 4c.1, 4c.2 and 4c.3 are moved along three tracks 6, 7 and 7.1 during handling by three times rotating each container receptacle unit 4c one hundred twenty degrees around the axis TA.

Common to the described embodiments is that the containers 2 or 2a are delivered to the container inlet as a single-track container stream, where they are transferred sequentially in a single-track container stream to the container receptacles moving past the container inlet on the outer track 6 and the processed containers are removed in the manner of a single-track container stream at the container outlet from the container receptacles moving past on the outer track 6. Delivery of the containers to the machine and the removal of the containers from the machine 1 can thus be accomplished using simple and proven means, which makes a decisive contribution to the service reliability of the respective handling machine 1.

The container handling machines 1 can be used for a wide variety of handling purposes, such as a rinser, sterilizer, sealer, labeling machine, etc. The container receptacles and the functional elements used for handling can be of a variety of designs and in one possible embodiment adapted to the respective application and/or to the type, shape and/or size of the containers.

The present application also teaches the design of the container receptacles as neck ring receptacles so that after being transferred to the rotor 3 of the container handling machine, the containers 2 do not stand on their base but rather are gripped at a collar located below the container opening. A technician skilled in the art knows such designs and methods as "neck handling," thus a detailed description is not given here.

Also common to the described embodiments is that the container receptacles 4.1, 4.2, 4a.1, 4a.2, 4b.1 through 4b.4 and 4c.1 through 4c.3 are configured such that the containers 2 or 2a are securely gripped to withstand in one possible embodiment the centrifugal force generated by the rotation of the rotor 3.

The present application was described above with reference to one possible embodiment. It will be understood that numerous modifications and derivations are possible without departing from the teaching on which the present application is based.

With a method for the handling of containers using a container handling machine of the rotary type having at least one rotor driven to rotate around a vertical machine axis, the handling of the containers takes place on the rotor in a plurality of tracks.

One feature or aspect of an embodiment is believed at the time if the filing of this patent application to possibly reside broadly in a method for the handling of containers 2, 2a using a rotary-type container handling machine 1 with at least one rotor 3 driven to rotate around a vertical machine axis, whereby the handling of the containers 2, 2a takes place on the rotor 3 and the containers are transferred sequentially for this purpose at least one container inlet 9 to the rotor 3 and moved with said rotor over at least a partial length of a first track 6 encircling the vertical machine axis and whereby the handled containers are removed from the rotor 3 at at least one container outlet 10, wherein the containers 2, 2a during handling are moved by the rotating rotor 3 by means of at least one track change over at least a partial length of at least one additional track 7, 7.1 encircling the vertical machine axis.

Another feature or aspect of an embodiment is believed at the time if the filing of this patent application to possibly reside broadly in the method, wherein the first track 6 and the at least one additional track 7, 7.1 are at different distances from the vertical machine axis.

Yet another feature or aspect of an embodiment is believed at the time if the filing of this patent application to possibly reside broadly in the method, wherein the first track 6 is at a greater distance from the vertical machine axis.

Still another feature or aspect of an embodiment is believed at the time if the filing of this patent application to possibly reside broadly in the method, wherein the first track and/or at least one additional track 7, 7.1 are configured as a circular arc encircling the vertical machine axis.

A further feature or aspect of an embodiment is believed at the time if the filing of this patent application to possibly reside broadly in the method, wherein during handling at least one track change occurs at least one predetermined angular position 12 of the rotation of the rotor 3.

Another feature or aspect of an embodiment is believed at the time if the filing of this patent application to possibly reside broadly in the method, wherein multiple track changes occur during the handling of each container 2, 2a.

Yet another feature or aspect of an embodiment is believed at the time if the filing of this patent application to possibly reside broadly in the method, wherein the containers 2, 2a are moved along two tracks 6, 7 during handling.

Still another feature or aspect of an embodiment is believed at the time if the filing of this patent application to possibly reside broadly in the method, wherein the containers 2, 2a are moved along at least three tracks 6, 7, 7.1 during handling.

A further feature or aspect of an embodiment is believed at the time if the filing of this patent application to possibly reside broadly in the method, wherein the handled containers 2, 2a are removed at at least one container outlet 10 on the first track 6.

Another feature or aspect of an embodiment is believed at the time if the filing of this patent application to possibly reside broadly in the method, wherein the containers 2, 2a are moved through an angle area of the rotating rotor 3 significantly greater than three hundred sixty degrees during handling.

Yet another feature or aspect of an embodiment is believed at the time if the filing of this patent application to possibly reside broadly in the method, wherein the containers 2, 2a are moved during handling through an angle area of less than three hundred sixty degrees on the first track 6 and through an angle area of three hundred sixty degrees or approximately three hundred sixty degrees on at least one additional track 7, 7.1.

Still another feature or aspect of an embodiment is believed at the time if the filing of this patent application to possibly reside broadly in the method, wherein the containers 2, 2a of at least one container inlet 9 are delivered as a single-track container stream.

A further feature or aspect of an embodiment is believed at the time if the filing of this patent application to possibly reside broadly in the method, wherein the containers 2, 2a are removed as a single-track container stream at least one container outlet 10.

Another feature or aspect of an embodiment is believed at the time if the filing of this patent application to possibly reside broadly in the method, wherein the containers are sequentially transferred at at least one container inlet 9 to container receptacles 4.1, 4.2; 4a.1, 4a.2; 4b.1 through 4b.4; 4c.1 through 4c.3 of the rotor moving past said container inlet 9 on the first track 6 and after handling are removed from the container receptacles 4.1, 4.2; 4a.1, 4a.2; 4b.1 through 4b.4; 4c.1 through 4c.3 at the at least one container outlet 10, and that the containers 2, 2a with the respective container receptacle 4.1, 4.2; 4a.1, 4a.2; 4b.1 through 4b.4; 4c.1 through 4c.3 are moved over at least a partial length of at least one additional track 7, 7.1.

Yet another feature or aspect of an embodiment is believed at the time if the filing of this patent application to possibly reside broadly in the method, wherein the at least one track change is effected by a movement of the container receptacles 4.1, 4.2; 4a.1, 4a.2; 4b.1 through 4b.4; 4c.1 through 4c.3 with the containers 2, 2a relative to the machine axis or to the rotor 3.

Still another feature or aspect of an embodiment is believed at the time if the filing of this patent application to possibly reside broadly in the method, wherein the container receptacles 4.1, 4.2; 4a.1, 4a.2; 4b.1 through 4b.4; 4c.1 through 4c.3 are moved at least once around an axis of rotation or swivel axis TA parallel or approximately parallel to the vertical machine axis and radial offset relative to the container receptacles 4.1, 4.2; 4a.1, 4a.2; 4b.1 through 4b.4; 4c.1 through 4c.3 from a first position into a second position with a different radial distance from the vertical machine axis compared to the first position, and that in each case another container receptacle moves into the first position.

A further feature or aspect of an embodiment is believed at the time if the filing of this patent application to possibly reside broadly in the method, wherein the movement of the container receptacles 4.1, 4.2; 4a.1, 4a.2; 4b.1 through 4b.4; 4c.1 through 4c.3 during the track change is such that each of the container receptacles 4.1, 4.2; 4a.1, 4a.2; 4b.1 through 4b.4; 4c.1 through 4c.3 moved out of the first track 6 is replaced by another container receptacle.

Another feature or aspect of an embodiment is believed at the time if the filing of this patent application to possibly reside broadly in the method, wherein the container receptacles 4.1, 4.2; 4a.1, 4a.2; 4b.1 through 4b.4; 4c.1 through 4c.3 are moved in such a way relative to the vertical machine axis or to the rotor 3 to effect the change between the first and the at least one additional track 6, 7 and/or for the change between two additional tracks 7, 7.1 that this relative motion has at least one motion component radial to the machine axis.

Yet another feature or aspect of an embodiment is believed at the time if the filing of this patent application to possibly reside broadly in the method, wherein the container receptacles 4.1, 4.2; 4a.1, 4a.2; 4b.1 through 4b.4; 4c.1 through 4c.3 are each swiveled around an axis TA radially offset from the receptacle and parallel or approximately parallel to the vertical machine axis to effect the track change.

Still another feature or aspect of an embodiment is believed at the time if the filing of this patent application to possibly reside broadly in the method, wherein the containers 2 stand upright in the container receptacles 4.1, 4.2; 4b.1 through 4b.4; 4c.1 through 4c.3.

A further feature or aspect of an embodiment is believed at the time if the filing of this patent application to possibly reside broadly in the method, wherein the containers 2a hang in the container receptacles 4a.1, 4a.2.

Another feature or aspect of an embodiment is believed at the time if the filing of this patent application to possibly reside broadly in the method, wherein at least two container receptacles 4.1, 4.2; 4a.1, 4a.2; 4b.1 through 4b.4; 4c.1 through 4c.3 form a container receptacle unit 4, 4a, 4b, 4c in which the container receptacles are arranged at the same radial distance from a receptacle axis TA, and that each container receptacle 4, 4a, 4b, 4c is rotated or swiveled for the track change.

Yet another feature or aspect of an embodiment is believed at the time if the filing of this patent application to possibly reside broadly in the method, wherein each container receptacle unit 4b, 4c has at least, in one possible embodiment four container receptacles.

Still another feature or aspect of an embodiment is believed at the time if the filing of this patent application to possibly reside broadly in the method, wherein in addition to the motion to effect the track change, the container receptacles 4a.1, 4a.2 can be rotated or swivelled around at least one axis, for example around an axis parallel or approximately parallel to the machine axis and/or around an axis tangential or approximately tangential to the direction of rotation A of the rotor 3.

A further feature or aspect of an embodiment is believed at the time if the filing of this patent application to possibly reside broadly in the method, wherein the containers 2a of at least one container inlet 9 are delivered in an upright position with the respective container opening at the top and are brought into a position other than the upright position, for example a top down position, at the container inlet 9 prior to or after the transfer to a container receptacle 4a.1, 4a.2, and that following handling the containers 2a are returned to their upright position at the container receptacles 4a.1, 4a.2 or at the at least one container outlet 10.

Another feature or aspect of an embodiment is believed at the time if the filing of this patent application to possibly reside broadly in the method, wherein the handling machine 1 is a filling machine for filling the containers 2 with a liquid product.

Yet another feature or aspect of an embodiment is believed at the time if the filing of this patent application to possibly reside broadly in the method, wherein the filling process is interrupted during at least one track change and resumed following the track change.

Still another feature or aspect of an embodiment is believed at the time if the filing of this patent application to possibly reside broadly in the method, wherein the quantity of product filled into the respective container prior to the at least one track change and following the at least one track change is added to obtain an actual value, and that said actual value is compared to a specified value to determine a residual quantity to be filled, which is then added to the respective container 2 during a corrective filling phase.

A further feature or aspect of an embodiment is believed at the time if the filing of this patent application to possibly reside broadly in the method, wherein the corrective filling phase occurs after another track change, in one possible embodiment after a track change to the first track 6.

Another feature or aspect of an embodiment is believed at the time if the filing of this patent application to possibly reside broadly in the method, wherein the handling machine 1 is configured as a rinser for cleaning the containers 2.

Still another feature or aspect of an embodiment is believed at the time if the filing of this patent application to possibly reside broadly in the method, wherein handling of the containers 2a with different liquid cleaning media takes place on the first and the at least one additional track 6, 7, 7.1, for example a pretense with water, in one possible embodiment with recycled water, on the first track 6 or on a section of the first track 6, and handling with an additional cleaning medium, in one possible embodiment with a cleaning medium comprising water and at least one cleaning agent takes place on a second, adjoining track 7, and following another track change there is also a post-spray for removing the handling medium or residues of this handling medium, for example with fresh water, whereby this post-spray takes place on the first track 6, for example.

One feature or aspect of an embodiment is believed at the time if the filing of this patent application to possibly reside broadly in a container handling machine of the rotary type for the handling of containers 2, 2a, having at least one rotor 3 with container receptacles 4.1, 4.2; 4a.1, 4a.2; 4b.1 through 4b.4; 4c.1 through 4c.3 driven to rotate around a vertical machine axis, whereby the containers 2, 2a to be handled are sequentially transferred at least one container inlet 9 to the container receptacles 4.1, 4.2; 4a.1, 4a.2; 4b.1 thorough 4b.4; 4c.1 thorough 4c.3 moved past said container inlet on a first track 6 encircling the vertical machine axis and the containers are removed from the container receptacles 4.1, 4.2; 4a.1, 4a.2; 4b.1 through 4b.4; 4c.1 through 4c.3 at least one container outlet after handling, wherein the container receptacles 4.1, 4.2; 4a.1, 4a.2; 4b.1 through 4b.4; 4c.1 through 4c.3 can be moved relative to the vertical machine axis or to the rotor 3 to effect a track change so that the containers 2, 2a arranged on the container receptacles 4.1, 4.2; 4a.1, 4a.2; 4b.1 through 4b.4; 4c.1 through 4c.3 are moved by the rotating rotor 3 along at least a partial length of at least on additional track 7, 7.1 encircling the vertical machine axis by means of at least one track change.

Another feature or aspect of an embodiment is believed at the time if the filing of this patent application to possibly reside broadly in the container handling machine, wherein the first track 6 and the at least one other track 7, 7.1 are at different distances from the vertical machine axis.

Yet another feature or aspect of an embodiment is believed at the time if the filing of this patent application to possibly reside broadly in the container handling machine, wherein the first track 6 is at a greater distance from the vertical machine axis.

Still another feature or aspect of an embodiment is believed at the time if the filing of this patent application to possibly reside broadly in the container handling machine, wherein the first track and/or at least one additional track 7, 7.1 are configured as a circular arc encircling the vertical machine axis.

A further feature or aspect of an embodiment is believed at the time if the filing of this patent application to possibly reside broadly in the container handling, wherein the container receptacles 4.1, 4.2; 4a.1, 4a.2; 4b.1 through 4b.4; 4c.1 through 4c.3 can be controlled such that the track change takes place during handling at least one predetermined angular position 12 of the rotation of the rotor 3.

Another feature or aspect of an embodiment is believed at the time if the filing of this patent application to possibly reside broadly in the container handling machine, wherein the container receptacles 4.1, 4.2; 4*a*.1, 4*a*.2; 4*b*.1 through 4*b*.4; 4*c*.1 through 4*c*.3 can be controlled such that multiple track change takes place during the handling of each container 2, 2*a*.

Yet another feature or aspect of an embodiment is believed at the time if the filing of this patent application to possibly reside broadly in the container handling machine, wherein the container receptacles 4.1, 4.2; 4*a*.1, 4*a*.2; 4*b*.1 through 4*b*.4; 4*c*.1 through 4*c*.3 can be controlled such that the containers 2, 2*a* are moved along two tracks 6, 7 during handling.

Still another feature or aspect of an embodiment is believed at the time if the filing of this patent application to possibly reside broadly in the container handling machine, wherein the container receptacles 4.1, 4.2; 4*a*.1, 4*a*.2; 4*b*.1 through 4*b*.4; 4*c*.1 through 4*c*.3 can be controlled such that the containers are moved along at least three tracks 6, 7, 7.1 during handling.

A further feature or aspect of an embodiment is believed at the time if the filing of this patent application to possibly reside broadly in the container handling machine, wherein the container receptacles 4.1, 4.2; 4*a*.1, 4*a*.2; 4*b*.1 through 4*b*.4; 4*c*.1 through 4*c*.3 can be controlled such that the handled containers 2, 2*a* are removed at least one container outlet 10 on the first track 6.

Another feature or aspect of an embodiment is believed at the time if the filing of this patent application to possibly reside broadly in the container handling machine, wherein the containers 2, 2*a* are moved through an angle area of the rotating rotor 3 significantly greater than three hundred sixty degrees during handling.

Yet another feature or aspect of an embodiment is believed at the time if the filing of this patent application to possibly reside broadly in the container handling machine, wherein the containers 2, 2*a* are moved during handling through an angle area of less than three hundred sixty degrees on the first track 6 and through an angle area of three hundred sixty degrees or approximately three hundred sixty degrees on at least one additional track 7, 7.1.

Still another feature or aspect of an embodiment is believed at the time if the filing of this patent application to possibly reside broadly in the container handling machine, wherein the containers 2, 2*a* of at least one container inlet 9 are delivered as a single-track container stream.

A further feature or aspect of an embodiment is believed at the time if the filing of this patent application to possibly reside broadly in the container handling machine, wherein the containers 2, 2*a* are removed as a single-track container stream at least one container outlet 10.

Another feature or aspect of an embodiment is believed at the time if the filing of this patent application to possibly reside broadly in the container handling machine, wherein the container receptacles 4.1, 4.2; 4*a*.1, 4*a*.2; 4*b*.1 through 4*b*.4; 4*c*.1 through 4*c*.3 can be moved at least once around an axis of rotation or swivel axis TA parallel or approximately parallel to the vertical machine axis and radial offset relative to the container receptacle 4.1, 4.2; 4*a*.1, 4*a*.2; 4*b*.1 through 4*b*.4; 4*c*.1 through 4*c*.3 from a first position into a second position with a different radial distance from the vertical machine axis compared to the first position, and that in each case another container receptacle moves into the first position.

Yet another feature or aspect of an embodiment is believed at the time if the filing of this patent application to possibly reside broadly in the container handling machine, wherein the container receptacles 4.1, 4.2; 4*a*.1, 4*a*.2; 4*b*.1 through 4*b*.4; 4*c*.1 through 4*c*.3 can be moved to effect the track change such that each of the container receptacles 4.1, 4.2; 4*a*.1, 4*a*.2; 4*b*.1 through 4*b*.4; 4*c*.1 through 4*c*.3 moved out of the first track 6 is replaced by another container receptacle.

Still another feature or aspect of an embodiment is believed at the time if the filing of this patent application to possibly reside broadly in the container handling machine, wherein the container receptacles 4.1, 4.2; 4*a*.1, 4*a*.2; 4*b*.1 through 4*b*.4; 4*c*.1 through 4*c*.3 can be moved in such a way relative to the vertical machine axis or to the rotor 3 to effect the change between the first and the at least one additional track 6, 7 and/or for the change between two additional tracks 7, 7.1 that this relative motion has at least one motion component radial to the machine axis.

A further feature or aspect of an embodiment is believed at the time if the filing of this patent application to possibly reside broadly in the container handling machine, wherein the container receptacles 4.1, 4.2; 4*a*.1, 4*a*.2; 4*b*.1 through 4*b*.4; 4*c*.1 through 4*c*.3 can each be swivelled around an axis TA radially offset from the receptacle and parallel or approximately parallel to the vertical machine axis to effect the track change.

Another feature or aspect of an embodiment is believed at the time if the filing of this patent application to possibly reside broadly in the container handling machine, wherein the container receptacles 4.1, 4.2; 4*b*.1 through 4*b*.4; 4*c*.1 through 4*c*.3 are configured for an upright arrangement of the containers 2.

Yet another feature or aspect of an embodiment is believed at the time if the filing of this patent application to possibly reside broadly in the container handling machine, wherein the container receptacles 0.1, 0.2; 4*b*.1 through 4*b*.4; 4*c*.1 through 4*c*.3 are configured for a hanging arrangement of the containers 2.

Still another feature or aspect of an embodiment is believed at the time if the filing of this patent application to possibly reside broadly in the container handling machine, wherein at least two container receptacles 4.1, 4.2; 4*a*.1, 4*a*.2; 4*b*.1 through 4*b*.4; 4*c*.1 through 4*c*.3 form a container receptacle unit 4, 4*a*, 4*b*, 4*c* in which the container receptacles are arranged at the same radial distance from a receptacle axis TA, and that each container receptacle 4, 4*a*, 4*b*, 4*c* is rotated or swivelled for the track change.

A further feature or aspect of an embodiment is believed at the time if the filing of this patent application to possibly reside broadly in the container handling machine, wherein each container receptacle unit 4*b*, 4*c* has at least, often four container receptacles.

Another feature or aspect of an embodiment is believed at the time if the filing of this patent application to possibly reside broadly in the container handling machine, wherein in addition to the motion to effect the track change, the container receptacles 4*a*.1, 4*a*.2 can be rotated or swivelled around at least one axis, for example around an axis parallel or approximately parallel to the machine axis and/or around an axis tangential or approximately tangential to the direction of rotation A of the rotor 3.

Yet another feature or aspect of an embodiment is believed at the time if the filing of this patent application to possibly reside broadly in the container handling machine, wherein the containers 2*a* of at least one container inlet 9 are delivered in an upright position with the respective container opening at the top and are brought into a position other than the upright position, for example a top down position, at the container inlet 9 prior to or after the transfer to a container receptacle 4a.1, 4a.2, and that following handling the containers 2a are returned to their upright position at the container receptacles 4a.1, 4a.2 or at the at least one container outlet 10.

Still another feature or aspect of an embodiment is believed at the time if the filing of this patent application to possibly reside broadly in the container handling machine, wherein it is a filling machine for filling the containers 2 with a liquid product.

A further feature or aspect of an embodiment is believed at the time if the filing of this patent application to possibly reside broadly in the method, wherein it is configured as a rinser for cleaning the containers 2.

Another feature or aspect of an embodiment is believed at the time if the filing of this patent application to possibly reside broadly in the container handling machine, wherein handling of the containers 2a with different liquid cleaning media takes place on the first and the at least one additional track 6, 7, 7.1, for example a prerinse with water, often with recycled water, on the first track 6 or on a section of the first track 6, and after a track change a handling process with an additional cleaning medium, in one possible embodiment with a cleaning medium comprising water and at least one cleaning agent takes place on a second, adjoining track 7, and following another track change there is also a post rinse for removing the handling medium or residues of this handling medium, for example with fresh water, whereby this post rinse takes place on the first track 6, for example.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of step motors which may possibly be utilized or adapted for use in at least one possible embodiment may possibly include the High Torque (square) Step Motor made by Anaheim Automation, 910 East Orangefair Lane, Anaheim, Calif. 92801-1195; the SMK550A-GN/5GN7.5SA Step Motor made by Oriental Motor Company, LTD, Overseas Department, 6-16-17 Ueno, Taito-ku, Tokyo, Japan; and the Powerpac K NEMA 42 made by Danaher and distributed by Intek Systems Inc., 176 Thorn Hill Road, Warrendale, Pa. 15086.

The following patents, patent applications or patent publications, are hereby incorporated by reference as if set forth in their entirety herein: WO2006/011896, having the title "SYSTEM FOR SECURELY CONVEYING ARTICLES AND RELATED COMPONENTS," published on Feb. 2, 2006.

All of the patents, patent applications or patent publications, which were cited in the International Search Report dated Sep. 21, 2007, and/or cited elsewhere are hereby incorporated by reference as if set forth in their entirety herein as follows: U.S. Pat. No. 5,509,524, having the title "ARTICLE TRANSPORTATION PROCESSING SYSTEM," published on Apr. 23, 1996; and U.S. Pat. No. 1,456,690, having the title "FILLING AND CAPPING MACHINE," published on May 29, 1923.

The purpose of incorporating U.S. patents, Foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The corresponding foreign and international patent publication applications, namely, Federal Republic of Germany Patent Application No. 10 2006 028 266.3, filed on Jun. 20, 2006, having inventor Volker TILL, and DE-OS 10 2006 028 266.3 and DE-PS 10 2006 028 266.3, and International Application No. PCT/EP2007/005342, filed on Jun. 18, 2007, having WIPO Publication No. WO2007/147543 and inventor Volker TILL, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

The purpose of incorporating the Foreign equivalent patent application PCT/EP2007/005342 and German Patent Application 10 2006 028 266.3 is solely for the purpose of providing a basis of correction of any wording in the pages of the present application, which may have been mistranslated or misinterpreted by the translator. Words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned word in this sentence, when not used to describe technical features of one or more embodiments, are not generally considered to be incorporated by reference herein.

Statements made in the original foreign patent applications PCT/EP2007/005342 and DE 10 2006 028 266.3 from which this patent application claims priority which do not have to do with the correction of the translation in this patent application are not to be included in this patent application in the incorporation by reference.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL NOMENCLATURE

1 Container handling machine
2, 2a Container
3 Rotor
4, 4a, 4b, 4c Container receptacle unit
4.1, 4.2 Container receptacle
4a.1, 4a.2 Container receptacle
4b.1-4b.4 Container receptacle
4c.1-4c.3 Container receptacle
5, 5a Carrier element
6, 7, 7.1 Track
8 Conveyor
9 Starwheel
10 Starwheel
11 Conveyor
12 Changeover position
13 Filling element
14 Hose
15 Annular vessel
16 Swivel arm A Rotation of the rotor 3
B Swivel or rotary motion of the respective container receptacle unit
TA Axis of the container receptacle unit

What is claimed is:

1. A method of handling containers in a rotary container handling machine, said method comprising:
   moving the containers from a container input to a rotor;
   rotating said rotor and moving containers handled thereby over an angular distance greater than 360° by moving the containers from a first path on said rotor to at least one other separate path on said rotor and then to said first path;
   said step of moving containers comprises moving containers into said rotor at an inlet point, then moving the containers away from said inlet point on said first path, and then moving the containers past said inlet point;
   treating the containers during movement of the containers by said rotor;
   moving the containers from said rotor to a container output; and said step of moving the containers along said paths comprises:
      moving the containers along substantially circular paths disposed about a central rotational axis of said rotor, each of which paths is disposed at a different radial distance from the central rotational axis; and
      moving the containers between paths at at least one predetermined position of each of said paths;
   said first path comprises an outer path and said at least one other path comprises at least one inner path disposed radially closer to the central rotational axis than said outer path;
   said step of moving containers along said paths comprises:
      moving each container along said outer path over an angular distance of less than 360°; and
      moving each container along said at least one inner path over an angular distance of one of: 360° or substantially 360°;
   said rotor comprises a plurality of container holding devices disposed about a peripheral area of said rotor, wherein said container holding devices each comprise a plurality of container receptacles, each of which is configured to receive and hold one of the containers;
   said step of moving the containers from said container input to said rotor comprises moving each of the containers in a single-track container stream into one of said container receptacles;
   said step of moving the containers along said paths comprises moving the containers and their respective container receptacles between paths;
   said step of moving the containers from said rotor to said container output comprises moving each of the containers out of its container receptacle to said container output in a single-track container stream;
   said step of moving the containers and their respective container receptacles comprises rotating each of said container holding devices about a rotational axis, which rotational axis is parallel or substantially parallel to the rotational axis of said rotor and radially offset and equidistant from its container receptacles; and
   said step of rotating each of said container holding devices comprises moving a first container receptacle from said outer path to one of said at least one inner path, and moving a second container receptacle from one of said at least one inner path to said outer path.

2. The method according to claim 1, wherein:
   said method further comprises moving another container into a container receptacle after a container has been moved out of the container receptacle; and
   said steps of moving said containers into their corresponding container receptacles comprise one of:
      standing said containers upright and vertically in their corresponding container receptacles; and
      hanging said containers in their corresponding container receptacles.

3. The method according to claim 2, wherein:
   said method of treating containers in a rotary container handling machine comprises filling containers in a rotary container filling machine with a liquid product; and
   said method further comprises interrupting the filling process prior to moving the container from one path to another path, and then resuming the filling process.

4. The method according to claim 3, wherein said method further comprises:
   upon moving the container back to said outer path, adding the quantities of product dispensed into the container on each path and calculating a total amount of dispensed product;
   comparing the calculated quantity to a predetermined quantity to be filled and determining if additional filling is needed to achieve the predetermined quantity; and
   upon determining additional filling is needed, continuing filling the container in said outer path to the predetermined quantity.

5. The method according to claim 2, wherein:
   said method of treating containers in a rotary container handling machine comprises cleaning containers in a rotary container cleaning machine;
   said step of moving the containers from said container input to said rotor comprises moving the containers in the upright position;
   said step of cleaning comprises:
      activating said container receptacle and moving the containers into a cleaning position in which the bottoms of the containers are higher than the tops of the containers in the vertical direction;
      moving the containers along said outer path and pre-rinsing the containers with recycled water;
      moving the containers to and then along said at least one inner path and cleaning the containers with a cleaning medium containing water and at least one cleaning agent;
      moving the containers to and along said outer path and spraying the containers with fresh water and removing the cleaning medium or residues thereof; and
      activating the container receptacle and moving the containers back into the upright position; and
   said step of moving the containers from said rotor to said container output comprises moving the containers in the upright position.

6. The method according to claim 2, wherein said step of moving the containers along said paths comprises moving the containers along more than two separate paths.

* * * * *